United States Patent

Fukushima

[11] Patent Number: 6,044,942
[45] Date of Patent: Apr. 4, 2000

[54] DYNAMIC DAMPER AND FLYWHEEL ASSEMBLY

[75] Inventor: Hirotaka Fukushima, Hirakata, Japan

[73] Assignee: Exedy Corporation, Osaka, Japan

[21] Appl. No.: 09/148,500

[22] Filed: Sep. 4, 1998

[30] Foreign Application Priority Data

Sep. 12, 1997 [JP] Japan ................................. 9-248951

[51] Int. Cl.$^7$ ................................ F16F 15/10; F16D 3/12; F16D 21/00
[52] U.S. Cl. .................... 192/30 V; 74/574; 192/48.5; 192/207; 192/209
[58] Field of Search ................................ 192/30 V, 48.5, 192/209, 207, 210, 210.1, 211; 267/293, 161; 74/574

[56] References Cited

U.S. PATENT DOCUMENTS

| | | | |
|---|---|---|---|
| 1,723,886 | 8/1929 | Pfaff | 192/70.17 |
| 1,828,508 | 10/1931 | Murray | 192/53.36 |
| 1,963,188 | 6/1934 | Wood | 192/207 |
| 1,977,368 | 10/1934 | Wood | 192/207 |
| 2,114,247 | 4/1938 | Davis | 192/207 |
| 2,775,105 | 12/1956 | Banker | 192/207 X |
| 2,958,526 | 11/1960 | Ulderup et al. | 267/63 |
| 3,209,875 | 10/1965 | Altmann | 192/66 |
| 4,157,227 | 6/1979 | Hahle | 403/228 |
| 4,257,510 | 3/1981 | Fisher | 192/207 |
| 4,655,614 | 4/1987 | Schott | 267/293 X |
| 4,828,090 | 5/1989 | Matsushita | 192/84.941 |
| 4,842,116 | 6/1989 | Fukushima | 192/106.2 |
| 4,844,224 | 7/1989 | Fukushima | 192/70.17 |
| 4,846,323 | 7/1989 | Fukushima | 192/30 |
| 5,135,089 | 8/1992 | Kovac | 192/70.17 |
| 5,152,510 | 10/1992 | Komabashiri | 267/141.2 |
| 5,168,971 | 12/1992 | Kovac | 192/30 |
| 5,190,269 | 3/1993 | Ikeda et al. | 267/140.12 |
| 5,253,740 | 10/1993 | Kohno et al. | 192/70.16 |
| 5,499,703 | 3/1996 | Kii et al. | 192/70.11 |
| 5,511,446 | 4/1996 | Kajitani et al. | 74/573 F |
| 5,669,820 | 9/1997 | Fukushima | 464/98 |
| 5,692,591 | 12/1997 | Kimura | 192/84.941 |
| 5,797,297 | 8/1998 | Mokdad | 74/574 |
| 5,901,616 | 5/1999 | Miner et al. | 74/574 |

FOREIGN PATENT DOCUMENTS 648031  6/1994  Japan .

*Primary Examiner*—Rodney H. Bonck
*Attorney, Agent, or Firm*—Shinjyu Global IP Counselors, LLP

[57] ABSTRACT

Dynamic dampers 10, 50 and 70 can operate in a flywheel assembly of a coupling mechanism 1 to dampen vibrations. Each of the dynamic dampers 10, 50 and 70 has an inner periphery supporting mechanism arranged radially inside of a mass member 11 or 71 for supporting the mass member 11 or 71. This arrangement allows the mass member 11 or 71 to be increased in mass without increasing the sizes of a flywheel assembly. The dynamic damper 10 can dampen both torsional and axial vibrations. The dynamic damper 10 includes a mass member 11, a sub-clutch 13 and an elastic portion assembly 12. The coupling mechanism 1 has a main clutch 3, which is operatively coupled between a crankshaft 8 of an engine and an input shaft 9. The mass member 11 can selectively rotate with the input shaft 9 upon engagement of the sub-clutch 13. The sub-clutch 13 releases an interlocked relationship between the input shaft 9 and the mass member 11 when the main clutch 3 disengages the crankshaft 8 from the input shaft. The elastic portion assembly 12 includes at least one rubber member, which elastically couples the input shaft 9 and the mass member 11 together in the rotating and axial directions when the sub-clutch 13 interlocks the input shaft 9 and the mass member 11 together. The dynamic damper 50 is to the dynamic damper 10, except that a pair of curved springs 61 are used instead of rubber members. The dynamic damper 70 includes a mass member 71, a sub-clutch 13 and coil springs 72. The coil springs 72 elastically couple the input shaft 9 and the mass member 71 in the rotating direction when the input shaft 9 and the mass member 71 are interlocked together by the sub-clutch 13.

38 Claims, 15 Drawing Sheets

DYNAMIC DAMPER AND FLYWHEEL ASSEMBLY

BACKGROUND OF THE INVENTION

1. Field of the Invention

This invention generally relates a dynamic damper and a flywheel assembly. More specifically, the present invention relates to a dynamic damper, which operates in accordance with an operation of an input shaft of a transmission for dampening a vibration.

2. Background Information

In connection with such a dynamic damper and a flywheel assembly, the assignee of the present invention has already developed prior art devices, some of which are disclosed in Japanese Laid-Open Patent Publication No. 6-48031 (1994), as well as other similar dynamic dampers and flywheel assemblies.

In the above-mentioned prior art devices, a second flywheel forming a mass portion is coupled to a drive and transmission system through a torsional damper mechanism. The torsional damper mechanism includes coil springs to dampen a torsional vibration on the drive and transmission system only when a clutch disk is pressed against a first flywheel. Thereby, an operation impeding shifting of the transmission is suppressed in a disengaged state of a clutch while suppressing gear noises (neutral noises) of the transmission in a neutral state as well as vibrations and noises of the transmission during driving of a vehicle.

In the above prior art, the second flywheel dampens the torsional vibration of the drive and transmission system, but the mass of the second flywheel is not utilized for suppressing the axial vibration.

In the above prior art, the second flywheel is supported in the circumferential direction by torsion springs, and is supported in the radial and axial directions by an outer periphery supporting mechanism. However, the outer periphery supporting mechanism is arranged radially outside the second flywheel. This arrangement of the outer periphery supporting mechanism reduces the space in which the second flywheel can occupy. This arrangement of the outer periphery supporting mechanism may reduce the mass of the second flywheel, which is used as a mass portion of the dynamic damper. Therefore, the desired dampening characteristics may not be achieved. Alternatively, it may be necessary to increase the outer diameter of the flywheel assembly for achieving desired dampening characteristics.

In view of the above, there exists a need for a dynamic damper and a flywheel assembly which has a supporting mechanism that decreases the amount of space occupied by the dynamic damper. Also there exists a need for a dynamic damper and a flywheel assembly which dampens the torsional vibration of the drive and transmission system and also suppresses the axial vibration by the mass of a second flywheel. This invention addresses this need in the prior art as well as other needs, which will become apparent to those skilled in the art from this disclosure.

SUMMARY OF THE INVENTION

An object of the present invention is to provide a dynamic damper and/or a flywheel assembly including a dynamic damper, which has an outer periphery supporting mechanism arranged radially inside a mass portion or flywheel for supporting the mass portion or flywheel. This arrangement and thereby the mass of the mass portion or flywheel can be increased without increasing sizes of the flywheel assembly.

According to a first aspect of the present invention, a dynamic damper is operable in a coupling mechanism to perform an operation interlocked with an input shaft of a transmission. The dynamic damper includes a mass portion, a sub-clutch and one or more elastic portions. The coupling mechanism is provided for coupling a crankshaft of an engine and the input shaft of the transmission, and includes a main clutch. The mass portion is operable in accordance with rotation of the input shaft of the transmission, and is radially supported at its radially inner portion. The sub-clutch releases an interlocked relationship between the input shaft of the transmission and the mass portion when the main clutch releases the coupling between the crankshaft of the engine and the input shaft of the transmission. The elastic portion elastically couples the input shaft of the transmission and the mass portion in the rotating direction when the input shaft of the transmission and the mass portion are interlocked together by the sub-clutch.

In this coupling mechanism provided with the dynamic damper, a torque supplied from the crankshaft of the engine is transmitted to the input shaft of the transmission through the main clutch. When the main clutch is in the engaged state, the sub-clutch attains the interlocked state in which the dynamic damper operates in accordance with the rotation of the input shaft of the transmission. Therefore, the dynamic damper dampens noises during the neutral state of the transmission and noises during driving. The above structure does not employ an inertia damper, which avoids a resonance by mere addition of inertia, but employs the dynamic damper. Therefore, it is possible to dampen the vibration of the input shaft of the transmission in a partial rotation range. Consequently, the vibration can be reduced to a level, which cannot be attained by the internal damper.

Since the mass portion is radially supported at its radially inner portion, it is not necessary to arrange a supporting mechanism or the like radially outside the mass portion. This allows the mass of the mass portion to be increased, and a range in which dampening characteristics can be set is also increased.

According to a second aspect of the present invention, the dynamic damper according to the first aspect of the present invention further includes an input plate and a support plate. The input plate is fixedly coupled to the sub-clutch. The support plate has an outer peripheral portion holding the mass portion and an inner peripheral portion engaged with the input plate, and thereby radially supports the mass portion with respect to the input shaft of the transmission. In this aspect of the present invention, the inner peripheral portion of the support plate, which is located radially inside the mass portion, is radially engaged with the input plate. Thereby, the mass portion is radially supported with respect to the input shaft of the transmission through the sub-clutch, the input plate and the support plate.

According to a third aspect of the present invention, the dynamic damper according to the second aspect of the present invention further has such a feature that the elastic portion includes at least one coil spring. The input plate is provided with a projected portion projected radially outward. The projected portion is engaged with an end of the coil spring, and has a radially outer end in contact with the support plate. The support plate is provided with an engagement surface, circumferentially supporting surfaces and a restricting surface. The engagement surface is engaged with the projected portion of the input plate. The circumferentially supporting surfaces are in contact with circumferentially opposite ends of the coil spring, respectively. The restricting surface restricts deformation of the coil spring in the direction along the input shaft of the transmission. In this aspect of the present invention, the coil spring is employed for elastically coupling the input shaft of the transmission and the mass portion together. For preventing deformation of the coil spring in the axial direction (i.e., direction along the input shaft of the transmission), the restricting surface of the support plate hold the coil spring.

The projected portion of the input plate functions as a portion which is engaged with the opposite ends of the coil spring for coupling the coil spring and the sub-clutch together. The projected portion of the input plate also functions as a portion which is in contact with the circumferentially supporting surface of the support plate for radially supporting the elastic portion, i.e., radially positioning the support plate and the elastic portion. Each of the input plate and the support plate can be made of a single plate member or a combination of two or more plate members.

According to a fourth aspect of the present invention, the dynamic damper according to the first aspect of the present invention further has such a feature that the elastic portion has a small cylindrical member, a large cylindrical member and a curved spring. The large cylindrical member has an inner diameter larger than an outer diameter of the small cylindrical member. The large cylindrical member is arranged radially outside the small cylindrical member. The curved spring is arranged between the small and large cylindrical members, and elastically couples the small and large cylindrical members together in the rotating and radial directions. This curved spring is prepared by curving a strip or a thin steel plate.

In this aspect of the present invention, the elastic portion is formed of the small and large cylindrical members as well as the curved spring elastically coupling them. The small cylindrical member is coupled to a portion on a transmission input shaft side, and the large cylindrical member is coupled to a portion on a mass portion side. Alternatively, the large cylindrical member is coupled to the portion on the transmission input shaft side, and the small cylindrical member is coupled to the portion on the mass portion side. Thereby, the elastic portion elastically couples the input shaft of the transmission and the mass portion together in the rotating direction.

In this manner, the large and small cylindrical members are coupled together by the curved springs interposed therebetween. Therefore, this elastic portion can couple the large and small cylindrical portions not only in the rotating direction but also in the radial direction. Therefore, the input shaft of the transmission and the mass portion coupled to the large and small cylindrical portions are coupled together in the radial direction so that the mass portion is radially positioned with respect to the input shaft of the transmission.

According to a fifth aspect of the present invention, the dynamic damper according to the fourth aspect of the present invention further has such a feature that the small and large cylindrical portions are coupled together by a combination of the two or more curved springs.

In this aspect of the present invention, the combination of two or more curved springs is employed for avoiding complication of the form of the curved spring. This complication may be caused if only one curved spring is used for coupling the cylindrical portions. Accordingly, the elastic portion in this aspect can be formed of the curved springs, which have relatively simple forms and therefore can be produced at a low cost.

According to a sixth aspect of the present invention, the dynamic damper constructed in accordance with either the fourth or fifth aspects of the present invention is further constructed such that the radial elasticity of the elastic portion between the small and large cylindrical members is larger than the rotational elasticity of the elastic portion between the small and large cylindrical members.

In this aspect of the present invention, an appropriate form of the spring and/or an appropriate combination of the springs are employed for providing different elasticities in the rotating and radial directions, and thus the elastic portion has an anisotropy. It is desired the elastic portion have a low rigidity in the rotating direction in view of improvement of a property of dampening a torsional vibration. It is desired the elastic portion have a high rigidity in view of positioning of the mass portion. The dynamic damper of this aspect can satisfy both the above demands.

According to a seventh aspect of the present invention, the dynamic damper according to the first aspect of the present invention further has such a feature that the elastic portion includes a rubber member. The mass portion is supported in the radial and axial directions by virtue of the rigidities of the rubber member in the radial and axial directions.

In this aspect of the present invention, the rubber member is used for coupling the input shaft of the transmission and the mass portion together in the rotating direction. The rubber member also functions to carry the mass portion in the radial and axial directions. Thus, such a structure is employed that the mass portion is supported in the rotating, radial and axial directions at the single and therefore concentrated point by coupling the input shaft of the transmission and the mass portion together by the rubber member. Therefore, the mass portion can be supported in the radial and axial directions at the radially inner portion of the mass portion. The rubber members of the elastic portion can only support the mass portion in the radial and axial directions.

According to an eighth aspect of the present invention, the dynamic damper according to the seventh aspect further has such a feature that the elastic portion has an anisotropy providing different elasticities in the rotating and radial directions, respectively.

In this aspect of the present invention, the elasticity of the elastic portion in the rotating direction is not equal to the elasticity of the same in the axial direction. The elastic portion also has different elasticities in the rotating and axial directions for dampening the torsional vibration in the intended frequency range and the axial vibration in the intended frequency range, respectively.

In this aspect, the anisotropy is provided in the elastic portion for setting the elasticity of the elastic portion in the rotating direction corresponding to the intended dampening characteristics. Also the anisotropy is provided in the elastic portion for setting the elasticities of the elastic portion in the radial and axial directions required for supporting the mass portion without causing problems such as interference with another member.

According to a ninth aspect of the present invention, the dynamic damper according to the eighth aspect of the present invention further has such a feature that the rubber member is provided with a hollow space for providing the elasticity of the elastic portion in the rotating direction smaller than the elasticities of the elastic portion in the radial and axial directions.

In this aspect, the rubber member is provided with the hollow such as a hole, and therefore the rubber member can have a form, which provides the anisotropy. This facilitates provision of the anisotropy in the elastic portion, and the elasticities can be easily and accurately determined by selecting the form and size of the hollow.

The dynamic damper according to this aspect further has such a feature that the rubber member is cylindrical. The elastic portion has the rubber member, a radially inner cylindrical member and a radially outer cylindrical member. The radially inner cylindrical member is attached to the inner peripheral surface of the rubber member, and the radially outer cylindrical member is attached to the outer peripheral surface of the rubber member.

One of the radially inner cylindrical member and the radially outer cylindrical member is coupled to the input shaft of the transmission, and the other is coupled to the mass portion so that the input shaft of the transmission and the mass portion are elastically coupled together. In this aspect of the present invention, the rubber member between the radially inner and outer cylindrical members is cylindrical, and receives a force through its inner and outer peripheral surfaces from the radially inner and outer cylindrical members, respectively. Thus, the rubber member has the cylindrical form and receives the force in the radial direction so that concentration of the stress in the rubber member can be suppressed.

According to this aspect of the present invention, the dynamic damper is operable in a coupling mechanism to perform an operation interlocked with an input shaft of a transmission and includes a mass portion, a sub-clutch and an elastic portion. The coupling mechanism is provided for coupling a crankshaft of an engine and the input shaft of the transmission, and includes a main clutch. The mass portion is operable in accordance with rotation of the input shaft of the transmission. The sub-clutch releases an interlocked relationship between the input shaft of the transmission and the mass portion when the main clutch releases the coupling between the crankshaft of the engine and the input shaft of the transmission. The elastic portion includes at least one rubber member, which elastically couples the input shaft of the transmission and the mass portion in the rotating direction when the input shaft of the transmission and the mass portion are interlocked together by the sub-clutch. The rubber member is provided with a cavity having a predetermined space and defined between a portion on the transmission input shaft side and a portion on the mass portion side spaced in the rotating direction from each other. The space of the cavity in the rubber member disappears in the rotating direction when the rubber member is deformed by a predetermined amount of force or more.

The dynamic damper vibrates to suppress the vibration of the input shaft of the transmission. Thus, the vibration of the input shaft of the transmission in a predetermined frequency range is suppressed by vibration of the dynamic damper.

When the dynamic damper vibrates, the rubber member of the elastic portion repetitively deforms. The elastic characteristics of the rubber member are determined according to the intended frequency range of the vibration to be dampened. A large torque acts on the dynamic damper, for example, when the input shaft of the transmission starts the rotation in accordance with engagement of the main clutch. This large torque may exert an excessively large torque, which is not allowed in view of the strength of the rubber member, and therefore, the excessively large torque may deteriorate the rubber.

The rubber member has a cavity having the predetermined space so that a stress larger than a predetermined magnitude may not be exerted on the rubber member that couples the input shaft of the transmission and the mass portion together even though an excessively large torque acts on the rubber member. When a large torque is applied between the input shaft of the transmission and the mass portion, the rubber member initially deforms to a predetermined extent, which is allowed in a portion of the rubber member and eliminates the space of the cavity. Thereafter, the portion of the rubber member on the transmission input shaft side is directly coupled in the rotating direction to the portion of the rubber member on the mass portion side. Thus, the portions of the rubber member on the transmission input shaft side and the mass portion side are directly coupled together in the rotating direction after a portion of the rubber member, which elastically couples the input shaft of the transmission and the mass portion together, deforms to a predetermined extent. When the portions of the rubber member on the transmission input shaft side and the mass portion side are directly coupled together in the rotating direction, a force acts on the portions of the rubber member on the transmission input shaft side and the mass portion side, but a force larger than that corresponding to the predetermined extent of deformation does not act on the portion of the rubber member which elastically coupled the input shaft of the transmission and the mass portion together before the cavity disappeared.

In the dynamic damper of this aspect of the present invention, as described above, the dampening characteristics are primarily determined by the elasticity in the rotating direction of the portion of the rubber members other than the portions on the transmission input shaft side and the mass portion side until the cavity disappears. Also, the dampening characteristics are primarily determined by the elasticities in the rotating direction of the portions on the transmission input shaft side and the mass portion side after the cavity disappears. As described above, such a structure is employed that an excessively large force is not exerted on the portion of the rubber member coupling the input shaft of the transmission and the mass portion together until the cavity disappears. According to the structure of this aspect, therefore, the dynamic damper can employ the rubber member having a sufficient strength. Also, by a simple manner, i.e., provision of the cavity in the rubber member, it is possible to provide the dynamic damper having several kinds of dampening characteristics.

According to a tenth aspect of the present invention, a flywheel assembly includes a flywheel and a dynamic damper. The flywheel is non-rotatably coupled to a crankshaft of an engine. The flywheel is disengageably coupled to a clutch disk assembly coupled to an input shaft of a transmission. The dynamic damper is the same as that according to any one of the first to ninth aspects of the present invention.

In this aspect of the present invention, the dynamic damper is incorporated together with the flywheel in the flywheel assembly. This facilitates an assembly operation for attaching the flywheel assembly to the crankshaft of the engine, the clutch disk assembly or the input shaft of the transmission. The flywheel is non-rotatably coupled to a crankshaft of an engine. The flywheel is disengageably coupled to a clutch disk assembly coupled to an input shaft of a transmission. In this aspect of the present invention, the dynamic damper is incorporated together with the flywheel in the flywheel assembly. This facilitates an assembly operation for attaching the flywheel assembly to the crankshaft of the engine, the clutch disk assembly or the input shaft of the transmission.

According to this aspect of the present invention, a dynamic damper is part of a coupling mechanism, which is operatively coupled to an input shaft of a transmission. The dynamic damper includes a mass portion, a sub-clutch and an elastic portion. The coupling mechanism is coupled between a crankshaft of an engine and the input shaft of the transmission, and includes a main clutch. The mass portion is adapted to rotate with the input shaft of the transmission. The sub-clutch releases the input shaft of the transmission from the mass portion when the main clutch releases the connection between the crankshaft of the engine and the input shaft of the transmission.

In one embodiment, the elastic portion includes one or more rubber members, which elastically couples the input shaft of the transmission and the mass portion in rotating and axial directions when the input shaft of the transmission and the mass portion are interlocked together by the sub-clutch.

In this coupling mechanism provided with the dynamic damper, a torque supplied from the crankshaft of the engine is transmitted to the input shaft of the transmission through the main clutch. When the main clutch is in the engaged state, the sub-clutch attains the interlocked state in which the dynamic damper operates in accordance with the rotation of the input shaft of the transmission. Therefore, the dynamic damper dampens noises during the neutral state of the transmission and noises during driving. The above structure does not employ an inertia damper, which avoids a resonance by mere addition of inertia, but employs the dynamic damper. Therefore, it is possible to dampen the vibration of the input shaft of the transmission in a partial rotation range. Consequently, the vibration can be reduced to a level, which cannot be attained by the internal damper. The dynamic damper of selected embodiments of the present invention acts even on the axial vibration, and therefore, the dynamic damper can dampen the axial vibration.

The foregoing and other objects, features, aspects advantages and salient features of the present invention will become more apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
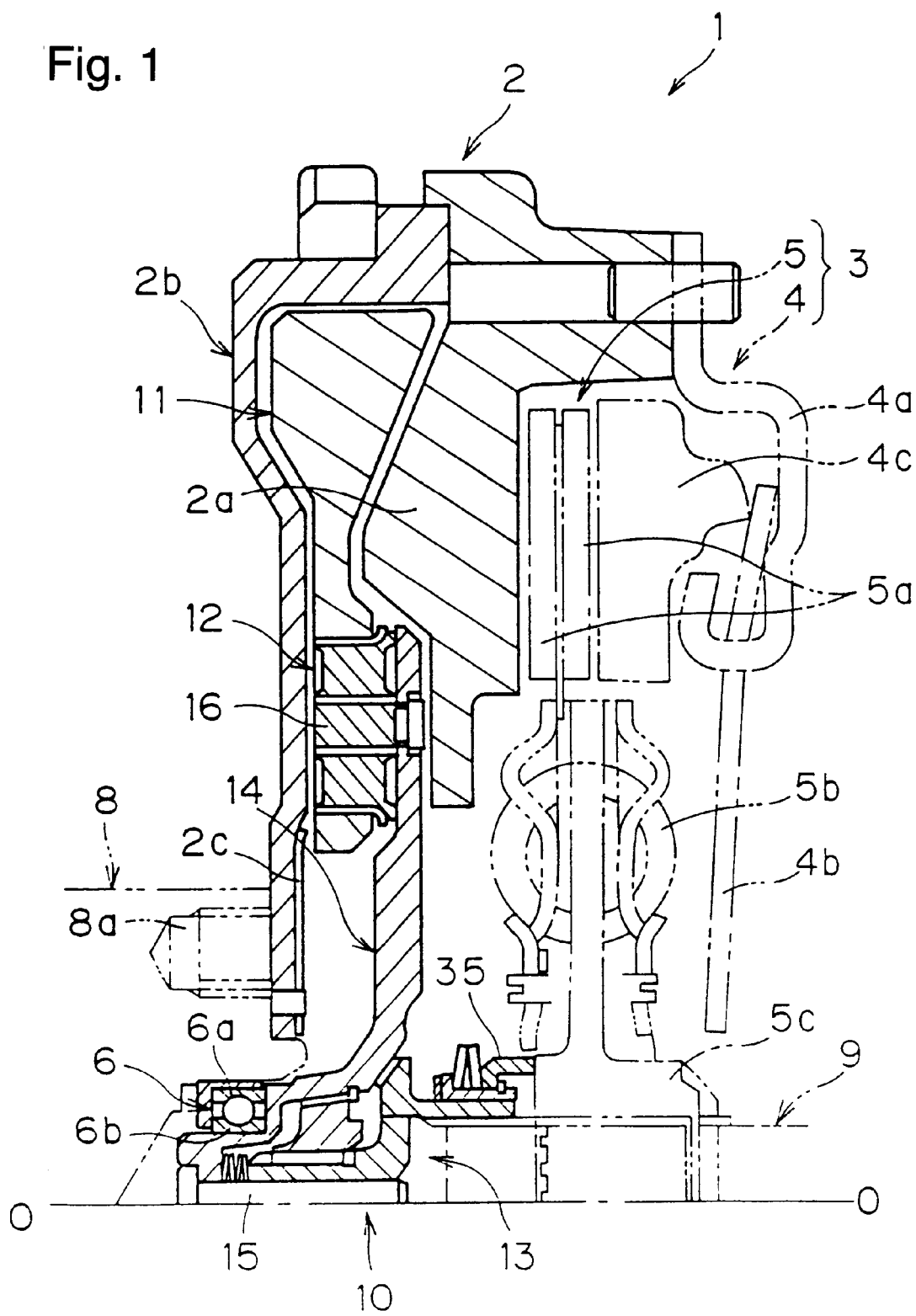
FIG. 1 is a partial cross-sectional view of the upper half of a flywheel assembly with a dynamic damper in accordance with one embodiment of the present invention.

Referring initially to FIG. 1, a partial cross-sectional view of a coupling mechanism 1 is illustrated in accordance with one embodiment of the present invention. The coupling mechanism 1 is basically formed of a flywheel assembly 2 and a main clutch 3. The main clutch 3 includes a clutch cover assembly 4 and a clutch disk assembly 5. The coupling mechanism 1 has a rotation axis represented by line O—O of FIG. 1.

The flywheel assembly 2, which is illustrated in FIG. 1, includes a dynamic damper 10 in accordance with one embodiment of the present invention. The flywheel assembly 2 and the dynamic damper 10 are part of a coupling mechanism 1, which engages and disengages a crankshaft 8 of an engine with an input shaft 9 of a transmission. The dynamic damper 10 functions to dampen vibrations of the transmission when coupled to the input shaft 9 of the transmission by a sub-clutch 13.

Figure 7:
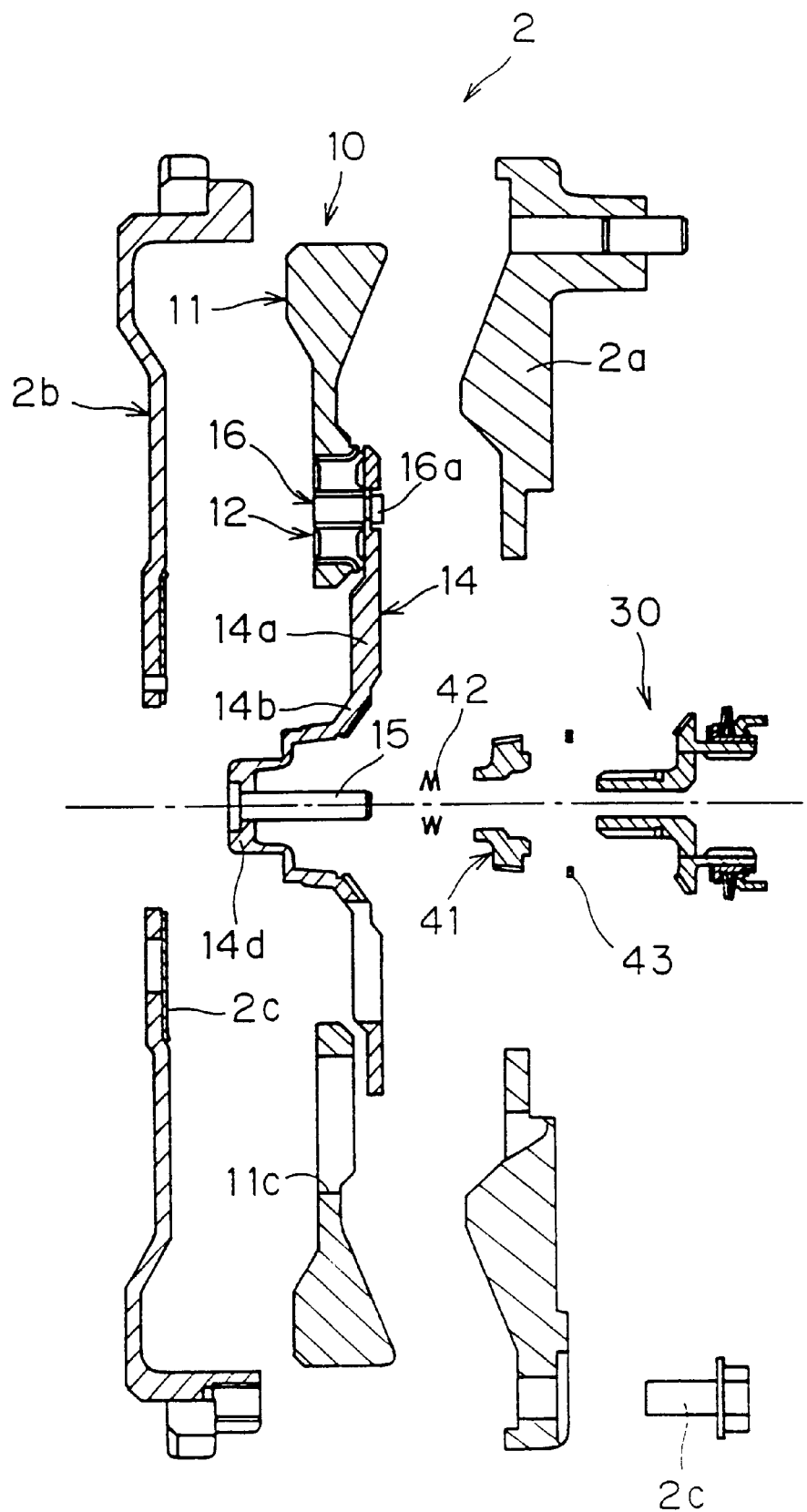
FIG. 7 is an exploded cross-sectional view of selected parts of the flywheel assembly illustrated in FIG. 1.

The flywheel assembly 2 is non-rotatably coupled to the crankshaft 8 of the engine. The flywheel assembly 2 is basically formed of a flywheel 2a, a flexible plate assembly 2b and the dynamic damper 10. As shown in FIG. 7, the flywheel assembly 2 is illustrated in an exploded form to show selected parts of the flywheel assembly 2. The flywheel 2 and the flexible plate assembly 2b are coupled together at their outer peripheral portions as shown in FIG. 1 in a conventional manner. The flexible plate assembly 2b is basically formed of a thick circular plate having a thin flexible plate 2c fixedly coupled to the inner peripheral portion of the thick circular plate. In particular, the inner end of the thin flexible plate 2c is fixedly coupled to the inner end of the thick circular plate. The other end of the flexible plate 2c is fixedly coupled to the crankshaft 8 of the engine by seven bolts 8a, which are circumferentially and equally spaced from each other. The dynamic damper 10 will be described later in detail.

As shown in FIG. 1, the clutch cover assembly 4 of the main clutch 3 basically includes a clutch cover 4a, an annular diaphragm spring 4b and a pressure plate 4c. The clutch cover assembly 4 of the main clutch 3 is normally biased toward the engine (i.e., leftward as viewed in FIG. 1) by the diaphragm spring 4b. The clutch cover 4a is fixedly coupled at its outer peripheral portion to an end of the flywheel 2a near the transmission (i.e., right end as viewed in FIG. 1). The inner peripheral portion of the clutch cover 4a carries a radially middle portion of the diaphragm spring 4b via wire rings (not shown) in a conventional manner. The pressure plate 4c is held within the clutch cover 4a in a conventional manner by the outer peripheral portion of the diaphragm spring 4b and other parts (not shown). The pressure plate 4c moves axially when a release bearing (not shown) moves the inner periphery of the diaphragm spring 4b along the rotation axis O—O, i.e., in the axial direction for biasing the pressure plate 4c by the diaphragm spring 4b or releasing the diaphragm spring 4b from the same. The clutch cover assembly 4 operates to bias the pressure plate 4c toward the flywheel 2a, and thereby operates to hold the clutch disk assembly 5 between the flywheel 2a and the pressure plate 4c for frictionally engaging the flywheel assembly 4 and the clutch disk assembly 5 together.

The clutch disk assembly 5 of the main clutch 3 is basically formed of a frictional engagement portion with friction facings 5a, a splined hub 5c and coil springs 5b. The splined hub 5c has an inner bore with splines for engaging the splines of the input shaft 9 of the transmission for rotation therewith. The coil springs 5b elastically couple the frictional engagement portion and the splined hub 5c together in the rotating direction.

Referring to FIGS. 1 and 7, a structure of the dynamic damper 10 will be described below. The dynamic damper 10 is basically formed of a mass member (mass portion) 11, elastic portion assemblies (elastic portions) 12, an input plate (input portion) 14 and a sub-clutch 13.

Figure 2:
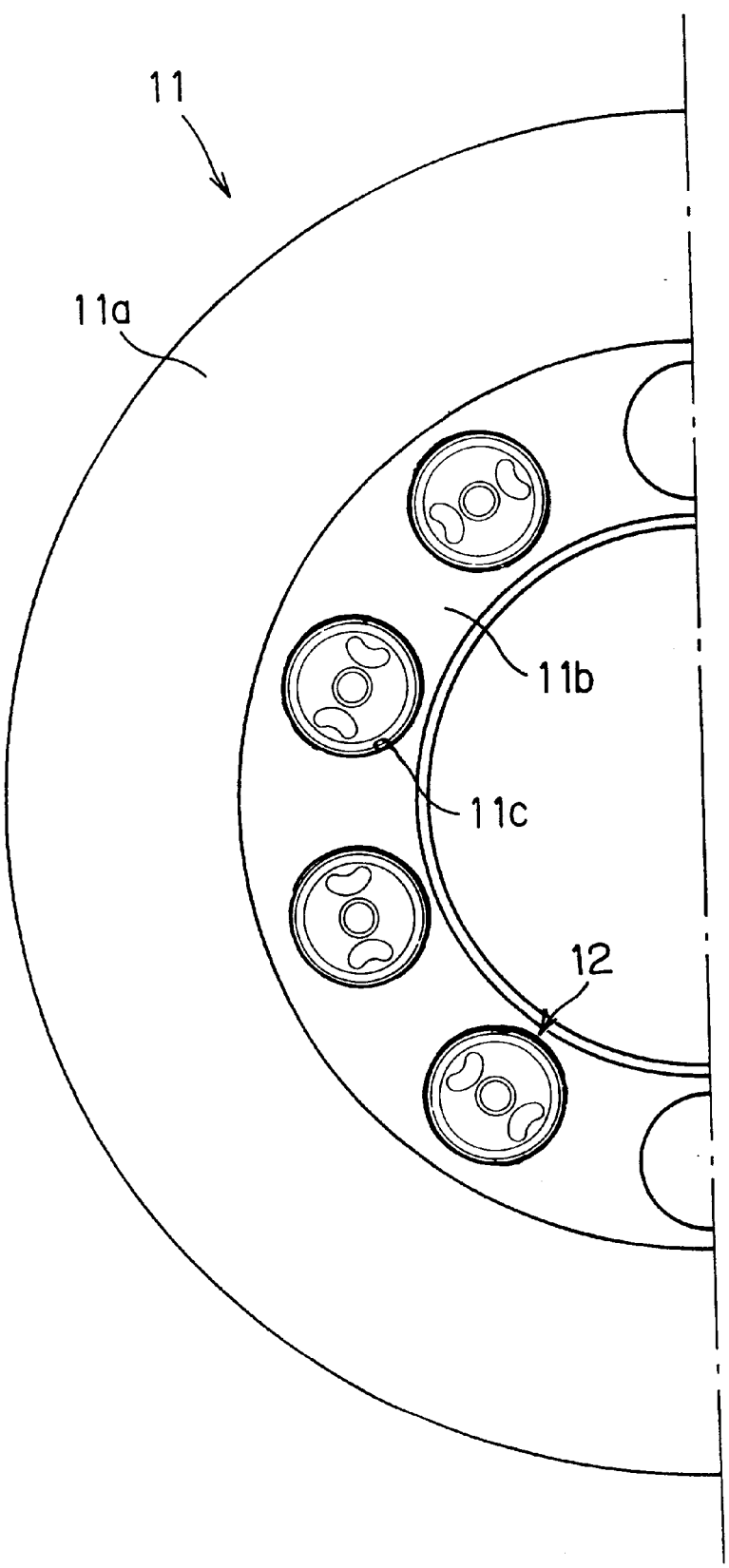
FIG. 2 is a partial inside elevational view of the mass member of the flywheel assembly illustrated in FIG. 1.

The mass portion 11 has an annular mass main portion 11a and annular or circular plate portion 11b. The main portion 11a has a generally triangular cross section, which diverges radially outward. The annular or circular plate portion 11b is integrally formed at the inner section of the main portion 11a, as shown in FIGS. 1 and 2. The circular plate portion 11b is preferably provided with ten circular apertures 11c which are circumferentially equally spaced from each other, as shown in FIG. 2. Each of the circular apertures 11c receives one of the elastic portion assemblies 12 therein.

Figure 3:
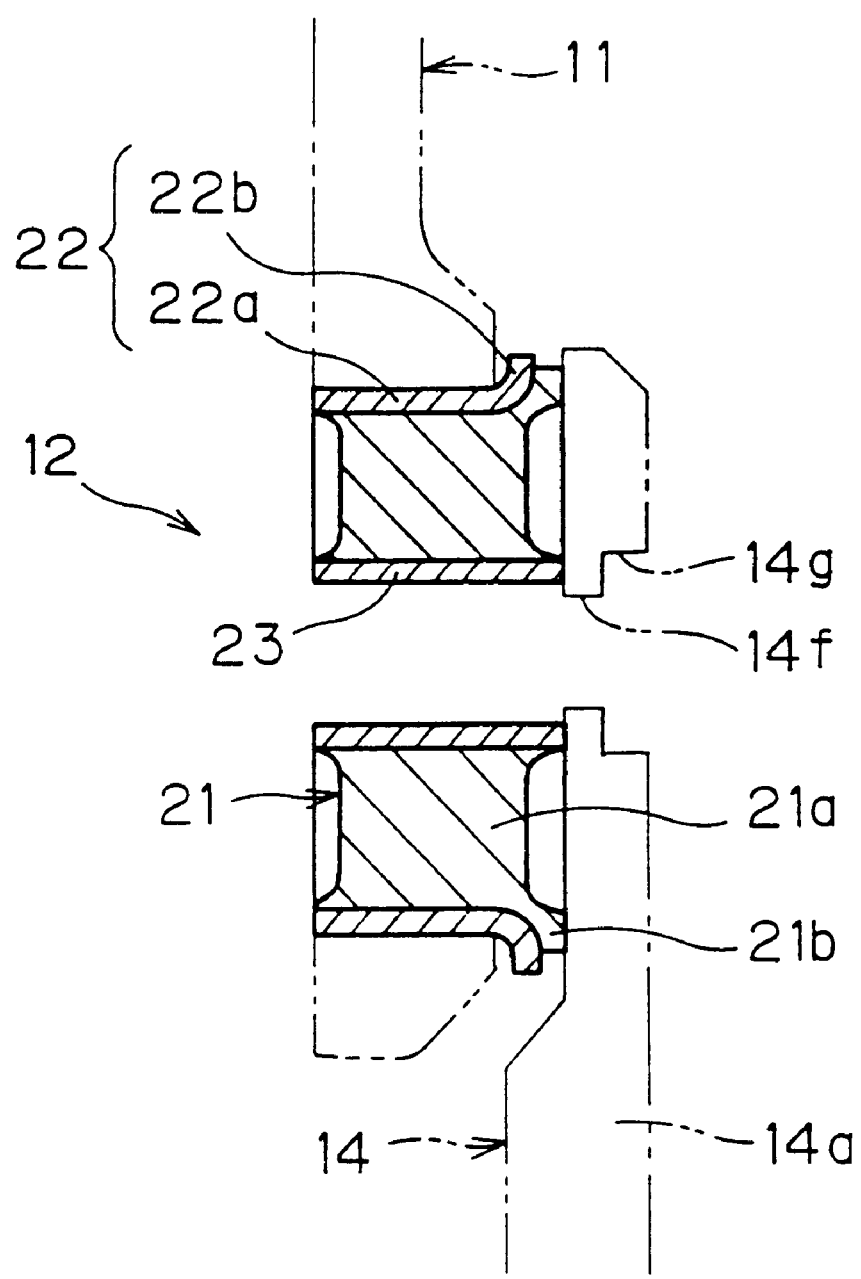
FIG. 3 is an enlarged partial cross-sectional view of an elastic portion assembly of the flywheel assembly illustrated in FIG. 1.
Figure 4:
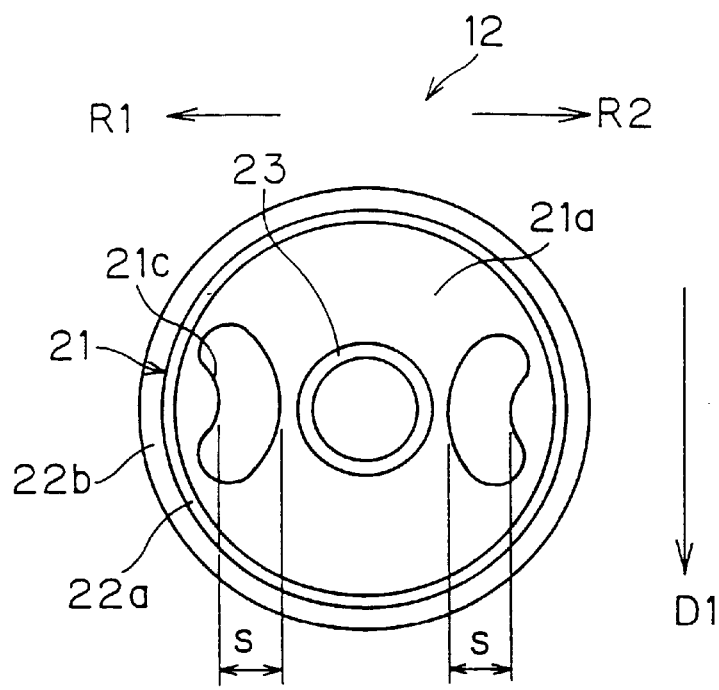
FIG. 4 is a right side elevational view of the elastic portion assembly illustrated in FIGS. 1 and 3 as viewed from the engine side of the flywheel assembly illustrated in FIG. 1.
Figure 5:
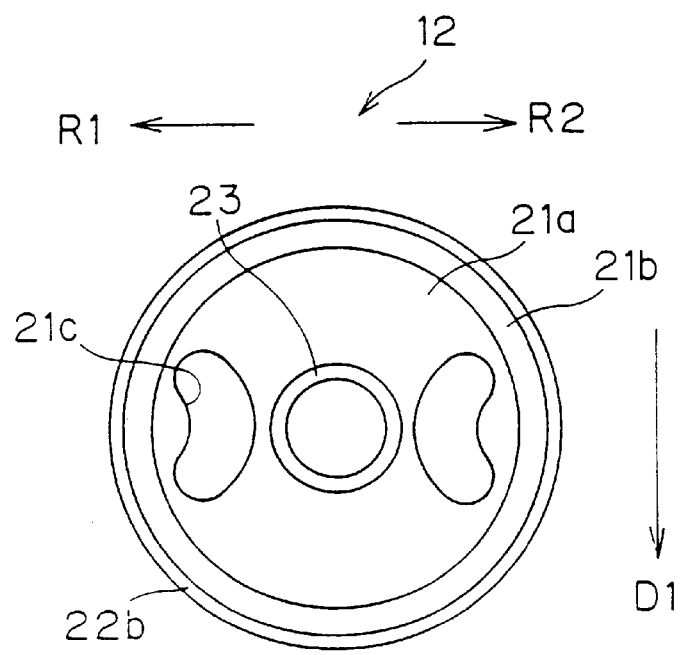
FIG. 5 is a left side elevational view of the elastic portion assembly illustrated in FIGS. 1, 3 and 4 as viewed from the transmission side of the flywheel assembly illustrated in FIG. 1.

The elastic portion assemblies 12 elastically couple the mass portion 11 and the input plate 14 together, as shown in FIGS. 1 and 3. As shown in FIGS. 3 to 5, each elastic portion assembly 12 is formed of a cylindrical rubber member 21, a radially outer cylindrical member 22, and a radially inner cylindrical member 23. The outer cylindrical member 22 is fixedly coupled to the outer peripheral surface of the rubber member 21. The radially inner cylindrical member 23 is fixedly coupled to the inner peripheral surface of the rubber member 21. The radially outer and inner cylindrical members 22 and 23 are made of a hard rigid material such as steel.

Each of the rubber members 21 is integrally formed of a main portion (first rubber portion) 21a and an outer peripheral projection (second rubber portion) 21b. The outer peripheral projection 21b is located on the outer peripheral surface (upper surface) of the main portion 21a. More specifically, the outer peripheral projection 21b is located on the right side as viewed in FIG. 3 (i.e., the side near the transmission) of the main portion 21a. As shown in FIGS. 4 and 5, each rubber member 21 is provided with two cavities 21c, which extend axially therethrough. In FIGS. 4 and 5, directions R1 and R2 represent the circumferential direction, and a direction D1 represents a radial direction. As shown in FIG. 4, each cavity 21c has an oblong form or kidney-shaped with its length extending in the radial direction and has its width (which will be referred to as a space) S extending in the circumferential direction. Accordingly, cavities 21c are longer in the radial direction than in the circumferential direction. Accordingly, cavities 21c are longer in the radial direction than in the circumferential direction.

The radially inner cylindrical member 23 has a cylindrical form and has an axial length substantially equal to the axial length of the rubber member 21 as shown in FIG. 3. The radially outer cylindrical member 22 also has a substantially cylindrical form. However, the axial length of the radially outer cylindrical member 22 is shorter than that of the radially inner cylindrical member 23 and the rubber member 21. The radially outer cylindrical member 22 is formed of a cylindrical portion 22a and a bent portion 22b extending radially outward from an end of the cylindrical portion 22a near the transmission side. The surface of the bent portion 22b facing the transmission is adhered to the surface of the outer peripheral projection 21b facing the engine.

Each elastic portion assembly 12 is disposed in the circular aperture 11c of the mass member 11, as shown in FIGS. 1, 2 and 7. The outer peripheral surface of the cylindrical portion 22a of the radially outer cylindrical member 22 is fixedly coupled to the inner peripheral surface of the circular aperture 11c. Each of the radially inner cylindrical members 23, on the other hand, is coupled to the outer peripheral portion of the input plate 14 through a pin 16 as shown in FIG. 1. Thus, each elastic portion assembly 12 elastically couples the mass portion 11 and the input plate 14 together in the circumferential, axial and radial directions.

Figure 12:
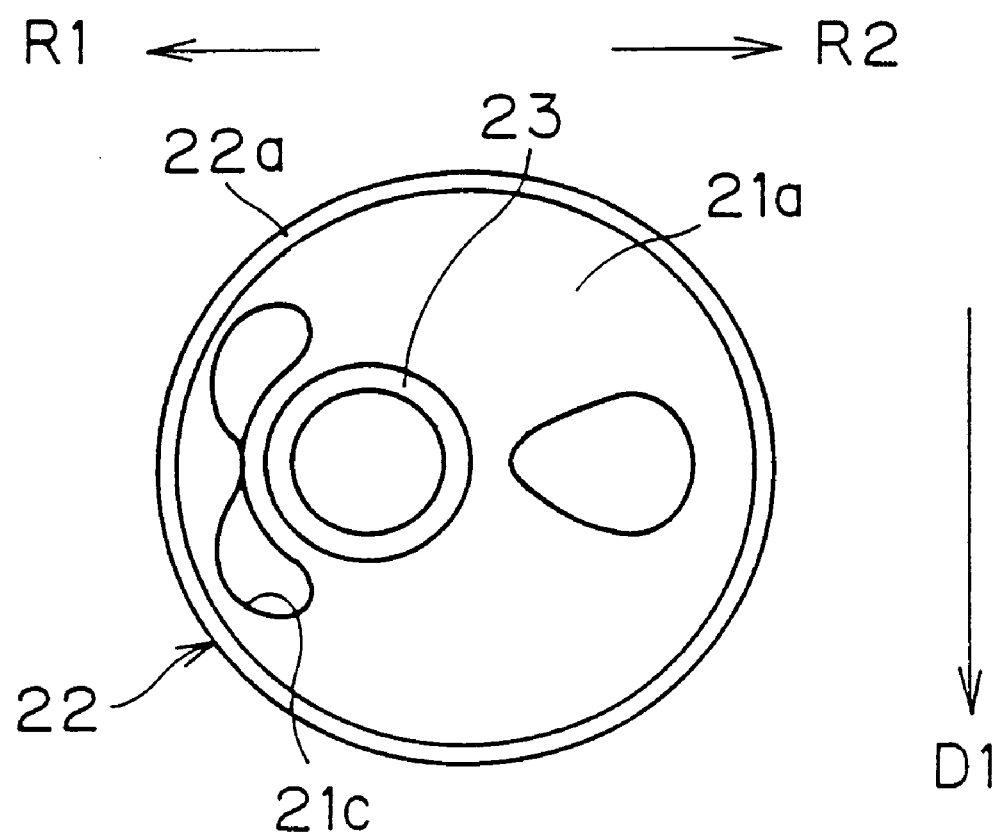
FIG. 12 is a side elevational view, similar to FIG. 4, of the elastic portion assembly but with it in a deformed state.

When a small amount of torque transmitted between the mass member 11 and the input plate 14, the elasticity of the elastic portion assemblies 12 in the circumferential direction primarily depends on a bending rigidity of the main portions 21a of the rubber members 21, which are diametrically opposed to each other with the radially inner cylindrical member 23 therebetween. When the torque transmitted between the mass member 11 and the input plate 14 increases, the mass member 11 and the input plate 14 move relatively to each other in the direction of rotation. This relative movement causes one of the cavities 21c in each rubber member 21 to collapse as shown in FIG. 12. Thereby, the elasticity of the elastic portion assembly 12 in the circumferential direction is primarily determined by the compression rigidity of the portion of the main portion 21a of the rubber member 21. More specifically, the compression rigidity of the portion which forms an end portion, in the circumferential direction, of the radially inner cylindrical member 23 and neighbors to the cavity 21c having the disappeared spaces. As can be seen from FIG. 12, after the spaces of one of the cavities 21c collapses or essentially disappears, the mass portion 11 and the input plate 14 are coupled substantially rigidly with substantially no elasticity therebetween.

The axial elasticity of the elastic portion assembly 12 is primarily determined by the compression rigidity of the outer peripheral projection 21b of the rubber member 21 in the axial direction as shown in FIG. 3.

The elasticity of the elastic portion assembly 12 in the radial direction is primarily determined by the compression rigidity of the main portion 21a of the rubber member 21. More specifically, the elasticity of the elastic portion assembly 12 in the radial direction is primarily determined by the compression rigidity of the portions of the main portion 21a which are diametrically opposed to each other with the radially inner cylindrical members 23 therebetween (see FIGS. 3 to 5).

Figure 8:
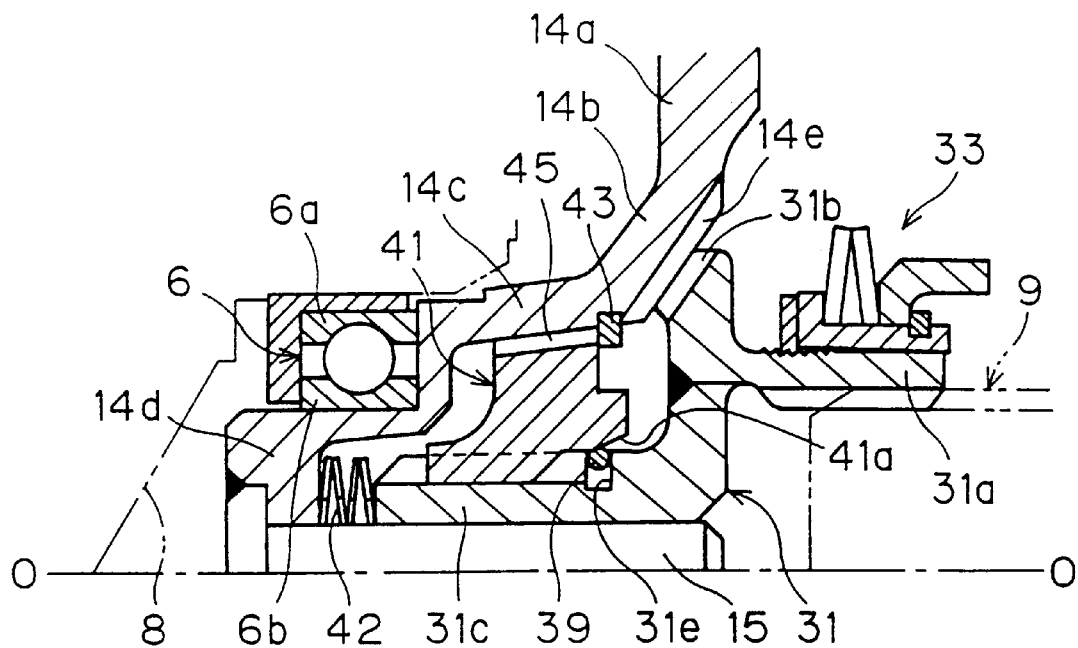
FIG. 8 is a partial cross-sectional view of the sub-clutch of the flywheel assembly illustrated in FIGS. 1 and 7, with the sub-clutch in a first disengaged position.

As shown in FIGS. 1, 7 and 8, the input plate 14 is integrally formed of an annular plate portion 14a, a conical portion 14b, a cylindrical portion 14c and a concave portion 14d. The input plate 14 is fixedly coupled at its radially inner portion to an inner race 6b of the ball bearing 6 as shown in FIG. 1, while an outer race 6a of the bearing 6 is fixedly coupled to the crankshaft 8 of the engine as shown in FIG. 1. Accordingly, the input plate 14 is coupled to the crankshaft 8 of the engine via the ball bearing 6 for rotational movement therebetween. However, the input plate 14 is non-movably coupled to the crankshaft 8 of the engine in both the axial and radial directions.

As shown in FIGS. 3 and 7, the annular plate portion 14a has apertures 14f located at its radially outer portions, that which restrict the movement of the respective pins 16 in the rotating and radial directions. As seen in FIG. 3, the annular plate portion 14a is also provided with a plurality of recesses 14g for restricting the movement of heads 16a of the respective pins 16 toward the engine. Thus, the heads 16a of the pins 16 engaging recesses 14g (i.e., leftward as viewed in FIG. 3) restricts movement of the elastic portion assemblies 12 toward the engine.

The movement of the elastic portion assemblies 12 toward the transmission is restricted by the ends of the radially inner cylindrical members 23 on the transmission side contacting the surface of the annular plate member 14a which faces toward the engine side. The movement of the elastic portion assemblies 12 toward the transmission is also restricted by the surfaces of the outer peripheral projections 21b on the transmission side contacting the surface of the annular plate member 14a facing the engine side.

The conical portion 14b extends radially inward and obliquely toward the engine from the inner periphery of the annular plate portion 14a. The conical portion 14b is provided at its inner peripheral surface with teeth 14e (second gear) as shown in FIG. 8.

The cylindrical portion 14c extends from the inner periphery of the conical portion 14b toward the engine substantially along the axis O—O. The cylindrical portion 14c has a tapered inner peripheral surface converging toward the engine.

The concave portion 14d is arranged radially inside the cylindrical portion 14c, and is provided at a center of its bottom with a recess and an aperture into which a core member 15 is inserted and fixedly coupled as noted in FIG. 1. The outer peripheral surface of the concave portion 14d is fixedly coupled to the inner race 6b of the ball bearing 6 (see FIGS. 1 and 8).

As described above, the mass portion 11 is coupled to the elastic portion assemblies 12. The elastic portion assemblies 12 are in turn coupled to the input plate 14, which is carried on the crankshaft 8 of the engine. Thus, these three components (the mass portion 11, the elastic portion assemblies 12 and the input plate 14) are rotatably carried on the crankshaft 8 of the engine.

The sub-clutch 13 is a clutch mechanism of a gear-meshing type for selectively engaging and disengaging the above three components (the mass member 11, the elastic portion assemblies 12 and the input plate 14) with and from the input shaft 9 of the transmission. As shown in FIGS. 7–11, the sub-clutch 13 is basically formed of a synchronous gear assembly 30, a synchronous block 41, a return spring 42, a snap ring 43 and the inner peripheral portions 14b, 14c and 14d of input plate 14.

As shown in FIGS. 6 and 8–11, the synchronous gear assembly 30 basically includes a main body 31, a force reducing mechanism 33, a one-way engagement member 34 and a wire ring 39. The synchronous gear assembly 30 is provided with a position correcting mechanism 32, which is formed by one-way grooves 31d and one-way engagement member 34 as discussed below.

The main body 31 is basically formed of a large cylindrical portion 31a, a synchronous gear (first gear) 31b extending radially outward from the end of the large cylindrical portion 31a nearest to the engine, and a small cylindrical portion 31c extending radially inward from the end of the large cylindrical portion 31a nearest to the engine.

Figure 6:
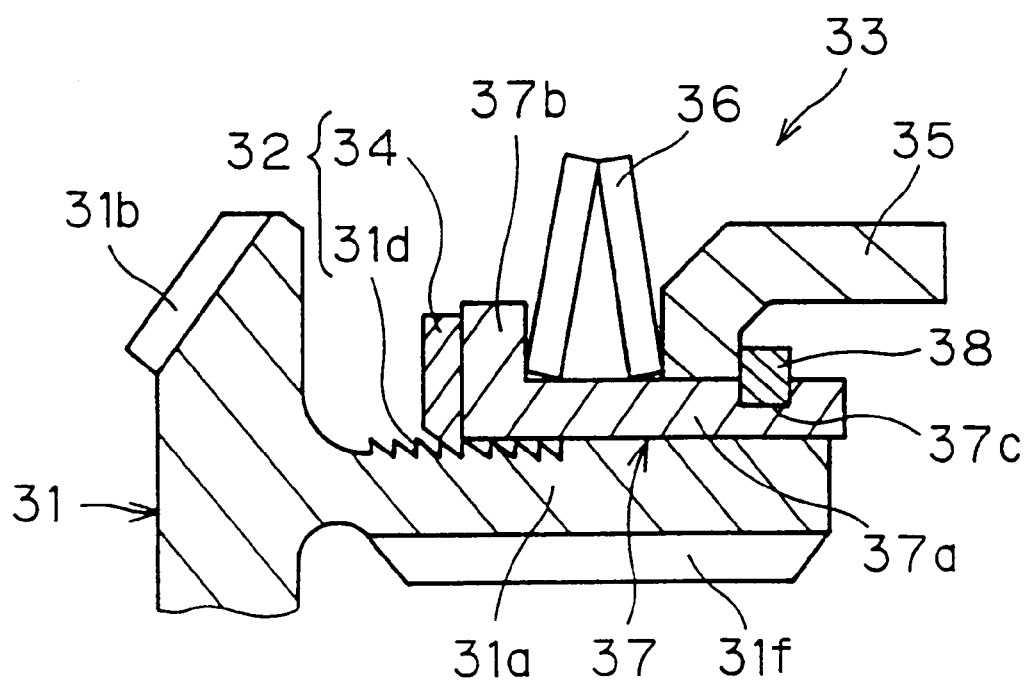
FIG. 6 is an enlarged partial cross-sectional view of part of the sub-clutch and the position correcting mechanism of the flywheel assembly illustrated in FIG. 1.

The large cylindrical portion 31a is provided at its inner peripheral surface with spline grooves 31f which are engaged with the splines of the input shaft 9 of the transmission (see FIG. 6). Thus, the main body 31 is spline-engaged with the input shaft 9 of the transmission. This arrangement allows main body 31 to move axially with respect to the input shaft 9 of the transmission. However, the main body 31 cannot rotate with respect to the input shaft 9 of the transmission. The large cylindrical portion 31a is also provided at its outer peripheral surface with one-way grooves 31d as shown in FIG. 6. The surfaces of each one-way groove 31d facing the engine, i.e., the surface defining the right edge of the groove as seen in FIG. 6, is substantially perpendicular to the rotation axis O—O. The surface of the one-way grooves 31d facing the transmission, i.e., the left surface as seen in FIG. 6, are inclined such that their inner peripheries are shifted toward the transmission with respect to their outer peripheries.

Figure 10:
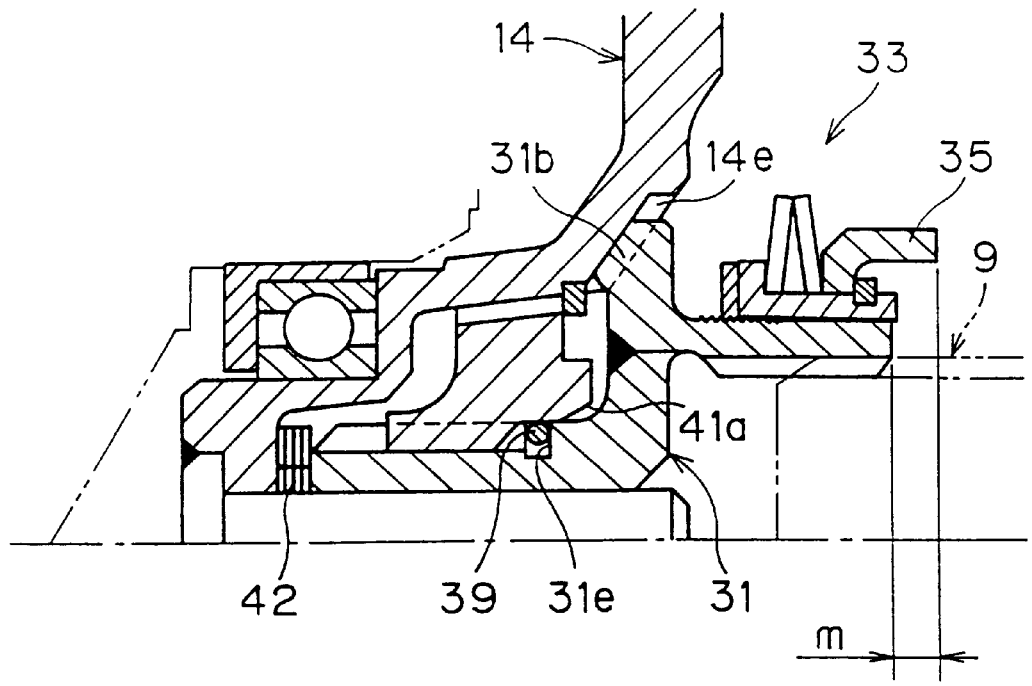
FIG. 10 is a partial cross-sectional view of the sub-clutch of the flywheel assembly illustrated in FIGS. 1 and 7, with the sub-clutch in a first engaged position.

The synchronous gear 31b is opposed to the teeth 14e of the conical portion 14b of the input plate 14. A small space is formed between the teeth 14e of the input plate 14 and the teeth of the synchronous gear 31b when the sub-clutch 13 is in the disengaged state shown in FIG. 8. When the sub-clutch 13 is in the engaged state as shown in FIG. 10, the teeth 14e of input plate 14 engages the teeth of the synchronous gear 31b.

The small cylindrical portion 31c of the main body 31 has a smaller diameter than the large cylindrical portion 31a. The inner peripheral surface of the small cylindrical portion 31c is in axially movable contact with the core member 15. The outer peripheral surface of the small cylindrical portion 31c is provided with teeth at its portion nearest to the engine (left portion as viewed in FIG. 8), and is also provided with an annular groove 31e at a portion nearest to the transmission (right potion as viewed in FIG. 8). The opposite side surfaces of the groove 31e restrict the axial movement of the wire ring 39 with respect to the main body 31. The inner peripheral surface of the groove 31e has a diameter smaller than the inner diameter of the wire ring 39 so that the wire ring 39 in the groove 31e can elastically and radially deform towards the center of the assembly.

Referring to FIGS. 1 and 6, the force reducing mechanism 33 is provided for reducing the axial force being transmitted to the main body 31 from the spline hub 5c of the clutch disk assembly 5 to a predetermined value. As shown in FIG. 6, the force reducing mechanism 33 is basically formed of a transmitting member 35, a pair of springs 36, a spring retainer member 37 and a ring 38. The end of the transmitting member 35 nearest to the transmission contacts the end surface of the spline hub 5c, which faces the engine, as shown in FIG. 1.

As shown in FIG. 6, the spring retainer member 37 is formed of a cylindrical inner periphery retaining portion 37a and an axial restricting portion 37b extending radially outward from the end of the inner periphery retaining portion 37a which is nearest to the engine. A groove 37c is formed at a portion of the outer peripheral surface of the inner periphery retaining portion 37a nearest to the transmission for holding the ring 38 therein. The springs 36 are preferably two annular conical springs. Each spring 36 has an inner diameter nearly equal to the outer diameter of the inner periphery retaining portion 37a. The springs 36 are held between the end surface of the transmitting member 35 nearest to the engine and the end surface of the axial restricting portion 37b nearest to the transmission. The ring 38 is fixedly coupled in the groove 37c and restricts the movement of the transmitting member 35 toward the transmission.

The one-way engagement member 34 is an annular plate, which transmits the axial force between the force reducing mechanism 33 and the main body 31. As mentioned above, the one-way engagement member 34, together with the main body 31 and the one-way grooves 31d forms the position correcting mechanism 32. The inner peripheral surface of the one-way engagement member 34 is tapered and diverges toward the engine. The inclination of the inner peripheral surface of the one-way engagement portion 34 is substantially equal to the inclination of the surfaces of the one-way grooves 31d, which face the transmission. The surface of the one-way engagement member 34 facing the transmission is in contact with the axial restriction portion 37b of the spring retainer member 37 of the force reducing mechanism 33. The one-way engagement member 34 has a predetermined elasticity and radially deformed in an outward direction by a force applied radially outward to the inner peripheral surface thereof.

The position correction mechanism 32 utilizes the meshing of the one-way engagement member 34 with one of the one-way grooves 31d (i.e., a pair of one-way engagement portion) as well as elastic deformation of the one-way engagement member 34 (see FIG. 6 to obtain the correct relative position of the main body 31 and the force reducing mechanism 33). This position correction mechanism 32 prevents the relative movement in the axial direction between the force reducing mechanism 33 and the main body 31 when the axial force transmitted between the force reducing mechanism 33 and the main body 31 does not exceed a predetermined value (F1). When the axial force transmitted between the force reducing mechanism 33 and the main body 31 exceeds the predetermined value (F1), the position correction mechanism 32 shifts the main body 31 of the force reducing mechanism 33 toward the engine. When the axial force transmitted between the force reducing mechanism 33 and the main body 31 is not larger than the predetermined value (F1), the force biasing the force reducing mechanism 33 toward the engine is transmitted to the main body 31 through the contact portions of the inner peripheral surface of the one-way engagement member 34 and the surface of the one-way groove 31d opposed to the transmission. Thereby, the main body 31 moves the sub-stantially same distance as the force reducing mechanism 33. When the axial force transmitted between the force reducing mechanism 33 and the main body 31 exceeds the predetermined value (F1), a radial reaction force (F2) acts on the one-way engagement portion 34 and the main body 31 through the contact portions of the inner peripheral surface of the one-way engagement member 34 and the surface of the one-way groove 31d opposed to the transmission. When this force (F2) exceeds a predetermined value the force (F2) elastically deforms the one-way engagement member 34 to increase the inner diameter of the one-way engagement member 34 above the outer diameter of the surface of the one-way groove 31d. Thereby, the one-way engagement member 34 and the one-way groove 31d, which axially coupled the force reducing mechanism 33 and the main body 31 together, are disengaged from each other, and thus the coupling between the force reducing mechanism 33 and the main body 31 is temporarily released so that the force reducing mechanism 33 moves toward the engine with respect to the main body 31. Thereby, the one-way engagement portion 34 engages with the one-way groove 31d again in a new position.

Referring now to FIGS. 8–11, the wire ring 39 has a circular section and a predetermined elasticity, and is disposed in the groove 31e. The wire ring 39 is designed to control the engagement between the cylindrical portion 14c of the input plate 14 and the synchronous block 41.

The synchronous block 41 has an inner peripheral surface, which is splined. The splines of the synchronous block 41 engage the splines of the small cylindrical portion 31c of the main body 31 of the synchronous gear assembly 30. Thus, synchronous block 41 is non-rotatably coupled to the main body 31, but axially movably carried by the main body 31. The synchronous block 41 has a conical surface 41a, which converges toward the engine and engages wire ring 39. The conical surface 41a has one end with a diameter larger than the outer diameter of the wire ring 39 and the other end with a diameter smaller than the outer diameter of the wire ring 39 (see FIG. 8). The conical surface 41a contacts the wire ring 39 for transmitting a force between them.

A friction member 45 is attached to the outer peripheral surface of the synchronous block 41. The outer peripheral surface of the synchronous block 41 and the outer surface (friction surface) of the friction member 45 have the substantially same inclination as the inner peripheral surface of the cylindrical portion 14c of the input plate 14. The outer peripheral surface of the synchronous block 41 and the outer friction surface of the friction member 45 are frictionally engaged with the inner peripheral surface of the cylindrical portion 14c when the sub-clutch 13 is engaged.

The return spring 42 is preferably formed of four annular conical springs with their inner peripheries contacting the outer peripheral surface of the core member 15. The end of the return spring 42 nearest to the engine contacts the concave portion 14d of the input plate 14. The other end of the return spring nearest to the transmission contacts the small cylindrical portion 31c of the main body 31 of the synchronous gear assembly 30. Thereby, the return spring 42 biases the main body 31 of the synchronous gear assembly 30 toward the transmission.

The snap ring 43 has a square section, and is fitted into a groove formed at an end of the inner peripheral surface of the cylindrical portion 14c of the input plate 14 which is nearest to the transmission. The snap ring 43 contacts the outer peripheral portion of the end of the synchronous block 41 nearest to the transmission for restricting the axial movement of the synchronous block 41 toward the transmission.

The operation of the coupling mechanism 1 and the dynamic damper 10 will now be described in more detail. The rotation of the crankshaft 8 of the engine is selectively transmitted to the input shaft 9 of the transmission through the flywheel assembly 2 and the main clutch 3. When the main clutch 3 is in the disengaged state, i.e., the clutch disk assembly 5 is not frictionally engaged with the flywheel 2a and the pressure plate 4c. Also, in the disengaged state, the spline hub 5c is in the axial position shown in FIG. 1, and the sub-clutch 13 is in the disengaged state shown in FIG. 8. When the sub-clutch 13 is in the disengaged state shown in FIG. 8, the synchronous gear 31b is not in mesh with the teeth 14e, and the friction member 45 of the synchronous block 41 is not in frictional engagement with the cylindrical portion 14c of the input plate 14. Therefore, the synchronous gear assembly 30 and the synchronous block 41 rotate together with the input shaft 9 of the transmission, but the input plate 14, the elastic portion assembly 12 and the mass member 11 are independent of the input shaft 9 of the transmission.

When the main clutch 3 is to be engaged, the diaphragm spring 4b forces the pressure plate 4c to move toward the flywheel 2a so that the clutch disk assembly 5 is held between the flywheel 2a and the pressure plate 4c. Thereby, the crankshaft 8 of the engine is coupled to the input shaft 9 of the transmission. In this operation, as is well known, the flexible plate 2c of the flexible plate assembly 2b absorbs the axial vibration of the crankshaft 8 of the engine, and the coil springs 5b and other parts of the clutch disk assembly 5 dampen and absorb the torque variation.

Figure 9:
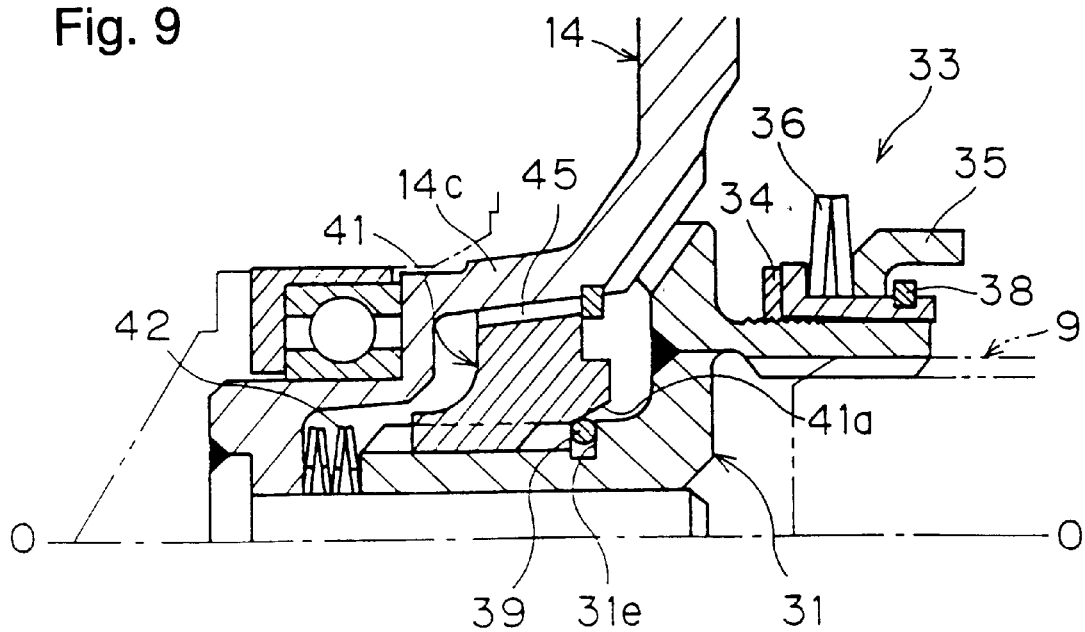
FIG. 9 is a partial cross-sectional view of the sub-clutch of the flywheel assembly illustrated in FIGS. 1 and 7, with the sub-clutch in a second disengaged position.

When the main clutch 3 is engaged, the spline hub 5c of the clutch disk assembly 5 moves axially toward the engine. Thereby, the spline hub 5c pushes the transmitting member 35 toward the engine to compress the springs 36 by a predetermined length (see FIG. 9). Before the state shown in FIG. 9 is attained, the main body 31 receives a reaction force of the springs 36 toward the engine. However, the main body 31 hardly moves in the axial direction because the conical surface 41a of the synchronous block 41 restricts the axial movement of the wire ring 39. As the reaction forces of the springs 36 increase, the wire ring 39 elastically deforms to reduce its diameter. The elastic reaction force of the wire ring 39 acts radially outward on the synchronous block 41 to push the same against the cylindrical portion 14c of the input plate 14. In this manner, the rotation speeds of the input shaft 9 of the transmission and the input plate 14 are gradually synchronized with each other owing to the friction between the friction member 45 of the synchronous block 41 and the cylindrical portion 14c of the input plate 14 until the structure attains the state shown in FIG. 9.

When the springs 36 in the state shown in FIG. 9 are further compressed to the state shown in FIG. 10, the reaction force of the springs 36 and the amount of the elastic deformation of the wire ring 39 increase so that the outer diameter of the deformed wire wing 39 becomes smaller than the inner diameter of the conical surface 41a. Thereby, the wire ring 39 receives from the synchronous block 41 only the force produced by the friction resistance between the wire ring 39 and the inner peripheral surface of the synchronous block 41. Since this force is much smaller than the reaction force of the springs 36, the springs 36 expand to move axially the main body 31 toward the engine while compressing the return spring 42. Thereby, the teeth of the synchronous gear 31b are engaged with the teeth 14e (see FIG. 10). In this operation, the rotation of the input shaft 9 of the transmission and the rotation of the input plate 14 are synchronized to a certain extent so that the teeth of the synchronous gear 31b can smoothly mesh with the teeth 14e. Thereafter, the input shaft 9 of the transmission is coupled to the dynamic damper 10 through the teeth of the synchronous gear 31b and the teeth 14e meshing with each other so that a sufficient torque transmission capacity can be achieved.

When the dynamic damper 10 is coupled to the input shaft 9 of the transmission, the dynamic damper 10 dampens neutral noises of the transmission and noises during driving. In particular, the dynamic damper 10 actively dampens the vibration of the transmission in a partial rotation range.

Figure 11:
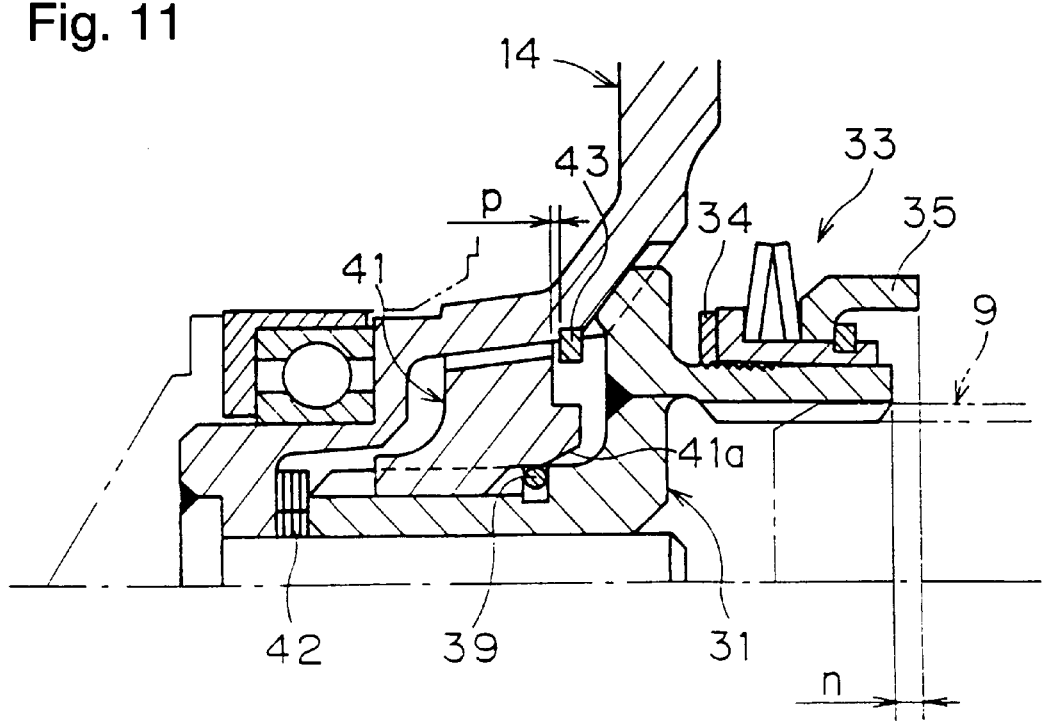
FIG. 11 is a partial cross-sectional view of the sub-clutch of the flywheel assembly illustrated in FIGS. 1 and 7, with the sub-clutch in a second engaged position.

When the coupling mechanism 1 is used for a long term, the friction facings 5a of the clutch disk assembly 5 of the main clutch 3 wear to reduce their axial length or thickness. This wear of the friction facings 5a increases the distance by which the spline hub 5c must move axially to engage the flywheel 12. In this case, the force reducing mechanism 33 moves further toward the engine from the position shown in FIG. 10. However, the concave portion 14d of the input plate 14 prevents the movement of the main body 31 toward the engine through the return spring 42 which is fully compressed so that a large reaction force occurs between the main body 31 and the force reducing mechanism 33. This reaction force pushes radially outward the one-way engagement member 34 through the surface of the one-way groove 31d of the main body 31 opposed to the transmission. Thereby, the one-way clutch engagement member 34 elastically deforms to increase its diameter so that the one-way engagement member 34 is released from one of the one-way grooves 31d and moves to the next one-way groove 31d. Thus, the force reducing mechanism 33 shifts toward the engine with respect to the main body 31 (see FIG. 11). In this manner, the axial positional relationship between the main body 31 and the force reducing mechanism 33 is corrected by the position correction mechanism 32 in accordance with the amount of wear occurring in the friction facings 5a. Thereby, the relative distance from the end of the main body 31 nearest to the transmission to the end of the transmitting member 35 nearest to the transmission changes from m as shown in FIG. 10 to n as shown in FIG. 11.

When the friction member 45 of the synchronous block 41 of the sub-clutch 13 wears, an axial component of the force by which the wire ring 39 pushes the conical surface 41a of the synchronous block 41 acts to move the synchronous block 41 toward the transmission. Thereby, as shown in FIG. 11, the synchronous block 41 and the input plate 14 shift in the axial direction relative to each other to compensate for the amount of wear occurring in the friction member 45. This axial shift is due to the inclination of the inner peripheral surface of the cylindrical portion 14c of the input plate 14. In FIG. 11, the distance of the above relative shifting between the synchronous block 41 and the input plate 14 is equal to p, and the gap having a length of p formed between the snap ring 43 and the synchronous block 41.

When the main clutch 3 is disengaged and the spline hub 5c moves toward the transmission, the reaction force of the return spring 42 moves the respective components of the sub-clutch 13 toward the transmission to disengaged the sub-clutch 13.

The advantages that can be achieved by employing the structure of the first embodiment of the present invention in the coupling mechanism 1 will now be discussed.

First, the elastic portion assemblies 12 radially and axially couples the mass member 11 to the input plate 14 at its radially inner side. Thus, the elastic portion assemblies 12, which include the rubber members 21, couples the mass member 11 to the input shaft 9 of the transmission. This results in the elastic portion assemblies 12 concentratedly functioning to hold and position the input portion of the mass member 11 with respect to the input plate 14 in the rotating, radial and axial directions. Therefore, it is not necessary to arrange an independent support mechanism or the like. For example, an independent support mechanism is not needed at the radially outside portion of the mass member 11. This allows the mass member to be increased in mass. Therefore, it is possible to increase a range in which damper characteristics can operate. Since each of the elastic portion assemblies 12 has an anisotropy, it is possible to set satisfactory the elastic characteristics of the elastic portion assemblies 12 in the rotating direction to correspond to the damper characteristics. Moreover, it is possible to set the elastic characteristics of the elastic portion assemblies 12 in the radial direction for supporting the mass member 11 without interfering with another member.

Secondly, the dynamic damper 10 employs the rubber members 21 in the elastic portion assemblies 12. This results in the structure of the elastic portion assemblies 12 having elasticity not only in the rotating direction but also in the axial direction. Therefore, the dynamic damper 10 can operate in response to the axial vibrations for dampening the axial vibrations. The transmission has a characteristic frequency with respect to the torsional vibration and a characteristic frequency with respect to the axial vibration, which are different from each other. Therefore, the intended frequency range of the torsional vibration to be dampened is different from the intended frequency range of the axial vibration to be dampened. In this connection, the rubber members 21 having elasticities in the rotating and axial directions are provided with the outer peripheral projection 21b. Therefore, the elasticity of the elastic portion in the rotating direction and the elasticity of the elastic portion in the axial direction can be determined independently from each other, and it is possible to reduce efficiently both the kinds of vibrations, i.e., the torsional vibration in the intended frequency range and the axial vibration in the intended frequency range.

Thirdly, deterioration of the rubber members 21 can be suppressed in the dynamic damper 10 of the foregoing embodiment. The dynamic damper 10 receive a large torque, for example, when the main clutch 3 is engaged to start the rotation of the input shaft 9 of the transmission. This large torque may apply an excessive stress to the rubber members, which is not allowed in view of strength, and therefore, the large torque may cause deterioration of the rubber members. In this embodiment, however, the rubber members 21 are provided with the cavities 21a each having predetermined spaces. Therefore, even if a large torque is applied between the mass member 11 and the input plate 14, which is coupled to the input shaft 9 of the transmission, the input plate 14 and the mass member 11 are substantially rigidly coupled together after the rubber members 21 deform to a certain extent eliminating the spaces of the cavity 21. The majority of the rubber members 21 are not subjected to forces larger than that corresponding to the predetermined deformation which eliminate the spaces. Accordingly, the rubber members 21 employed in the dynamic damper 10 can reliably have the intended strength. Since the rubber members 21 between the radially outer and inner cylindrical members 22 and 23 has the cylindrical form in this embodiment, it is possible to suppress concentration of the stress in the rubber members 21 which may occur when it receives a force in the circumferential direction.

Fourthly, the elastic portion assemblies 12 are employed for coupling the input plate 14 and the mass member 11. Therefore, the portion of each elastic portion assembly 12 coupled to the input plate 14 and the portion thereof coupled to the mass member 11 can be located at the opposite sides of each elastic portion assembly 12, in the circumferential direction. Therefore, the force transmitted from the input plate 14 to the mass member 11 does not act as a shearing force on the rubber members 21, but acts as compressing and bending forces on the rubber members 21. In this manner, the shearing deformation of the rubber members 21 is effectively suppressed, and the bending deformation and compressing deformation, which are allowed to a larger extent than the shearing deformation, primarily occur in the rubber members 21. Compared with the case that the input plate 14 and the mass member 11 are coupled together via the rubber members 21 deformed primarily in the shearing manner. Therefore, the stresses applied to the rubber members 21, the portion coupled to the input plate 14 and the portion coupled to the mass member 11 can be reduced without improving the quality of material of the rubber member 21 and without increasing the rigidity of the rubber member 21 (and thus without sacrificing a dampening performance).

Fifthly, the sub-clutch 13 is of the gear-meshing type, which generally allows a larger torque transmission capacity than the frictional engagement type. Therefore, the sub-clutch 13 can have smaller sizes, and can be disposed in the radially inner portion of the coupling mechanism 1 so that increase in size of the coupling mechanism 1 is suppressed. Owing to employment of the synchronous block 41 in the sub-clutch 13, the teeth of the synchronous gear 31b can smoothly mesh with the teeth 14e of the input plate 14, and the damages to the synchronous gear 31b and the teeth 14e of the input plate 14 can be suppressed.

Sixthly, the sub-clutch 13 has the position correcting mechanism 32. Therefore, the engaging and disengaging operations of the sub-clutch 13 are not adversely affected by wearing of the friction facings 5a of the main clutch 3. Even when wear occurs in the friction facings 5a, the dynamic damper 10 can operate effectively to dampen the vibrations of the transmission, in the same manner as before wear of the friction facings 5a.

Seventhly, the ball bearing 6 in this coupling mechanism 1 has the outer race 6a fixedly coupled to the crankshaft 8 of the engine and the inner race 6b fixedly coupled to the input plate 14 of the dynamic damper 10. Thereby, the space radially inside the ball bearing, which is useless in the prior art, can be effectively utilized. More specifically, in this embodiment, the space radially inside the ball bearing 6 is utilized for arranging the sub-clutch 13. Since the sub-clutch 13 is arranged in the radially inner portion of the coupling mechanism 1, the size of the coupling mechanism 1 does not need to be increased.

Second Embodiment

In the first embodiment described above, the elastic portion assembly 12 is employed for elastically coupling the mass portion 11 and the input plate 14. Alternatively, a second embodiment employs an elastic portion assembly 52 shown in FIGS. 13 to 15. In the following description of the second embodiment, parts and portions which are the same as or similar to those of the first embodiment will bear the same reference numbers. Thus, these similar structures will not be discussed in detail with reference to this embodiment. Rather, it will be apparent to those skilled in the art from this disclosure that the description of these similar structures as referred to the first embodiment also apply to this second embodiment.

Figure 13:
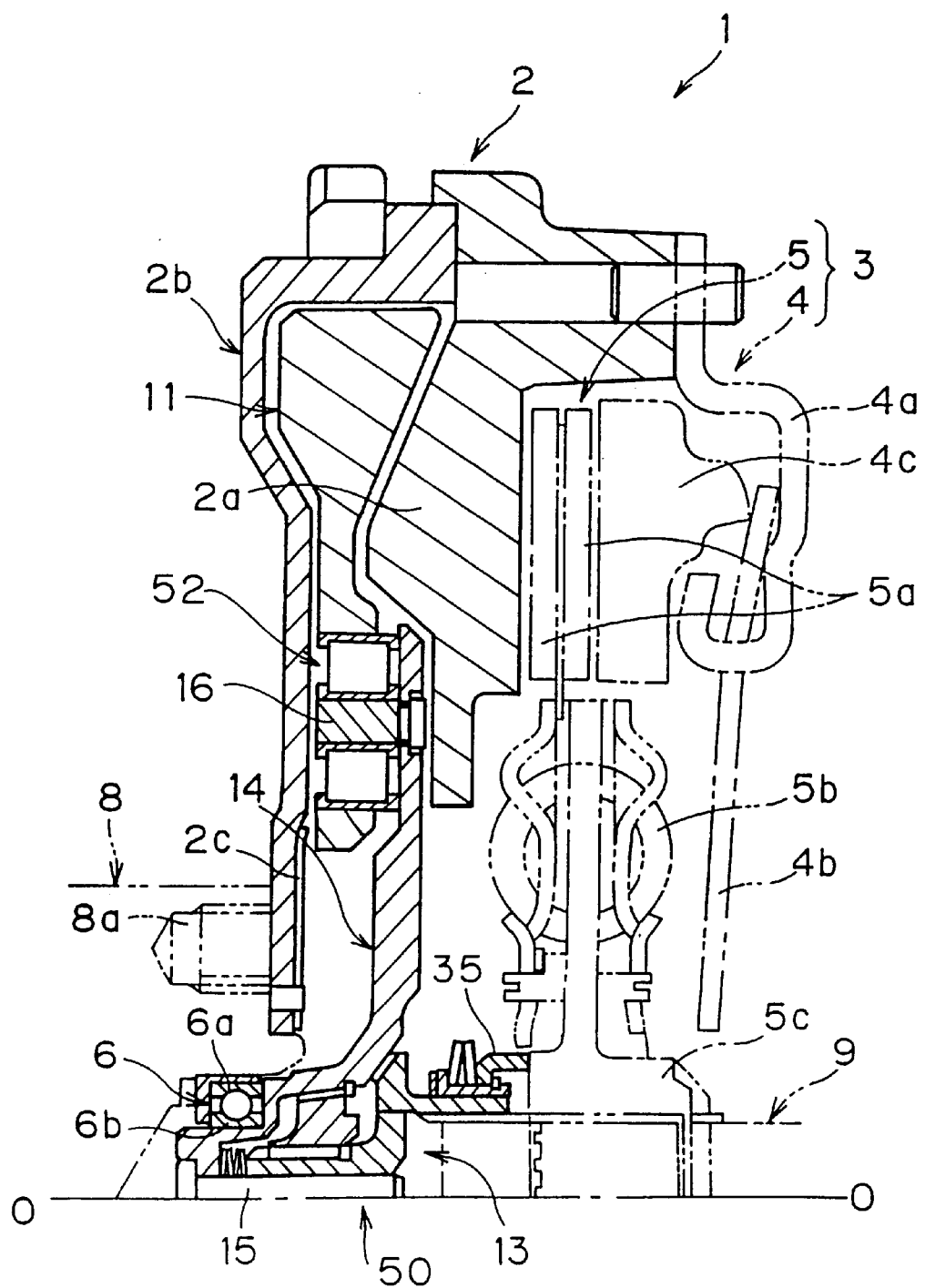
FIG. 13 is a partial cross-sectional view of a flywheel assembly with a dynamic damper employed in a coupling mechanism in accordance with a second embodiment of the present invention.

FIG. 13 shows a cross-sectional view of a flywheel assembly 2 including a dynamic damper 50 in accordance with the second embodiment of the invention. The dynamic damper 50 is included in the coupling mechanism 1 which engages and disengages the crankshaft 8 of the engine and the input shaft 9 of the transmission with respect to each other. The dynamic damper 50 functions to dampen a vibration of the transmission when coupled to the input shaft 9 of the transmission by the sub-clutch 13.

The coupling mechanism 1 is basically formed of the flywheel assembly 2 including the dynamic damper 50 and the main clutch 3 formed of the clutch cover assembly 4 and the clutch disk assembly 5. The coupling mechanism 1 has the rotation axis represented by line O—O in FIG. 13.

The flywheel assembly 2 is non-rotatably coupled to the crankshaft 8 of the engine. The flywheel assembly 2 is basically formed of the flywheel 2a, the flexible plate assembly 2b and the dynamic damper 50. The flywheel 2a and the flexible plate assembly 2 have structures similar to those of the first embodiment. Thus, these similar structures will not be discussed in detail with reference to this embodiment. Rather, it will be apparent to those skilled in the art from this disclosure that the description of these similar structures as referred to the first embodiment also apply to this second embodiment.

Structures and operations of the clutch cover assembly 4 and clutch disk assembly 5 of the main clutch 3 are also similar to those of the first embodiment. Thus, these similar structures will not be discussed in detail with reference to this embodiment. Rather, it will be apparent to those skilled in the art from this disclosure that the description of these similar structures as referred to the first embodiment also apply to this second embodiment.

The dynamic damper 50 is basically formed of the mass member (mass portion) 11, a plurality of elastic portion assemblies (elastic portions) 52, the input plate (input portion) 14 and the sub-clutch 13. The mass portion 11, the input plate 14 and the sub-clutch 3 are similar in construction to that of the first embodiment. Thus, these similar structures will not be discussed in detail with reference to this embodiment. Rather, it will be apparent to those skilled in the art from this disclosure that the description of these similar structures as referred to the first embodiment also apply to this second embodiment.

Figure 14:
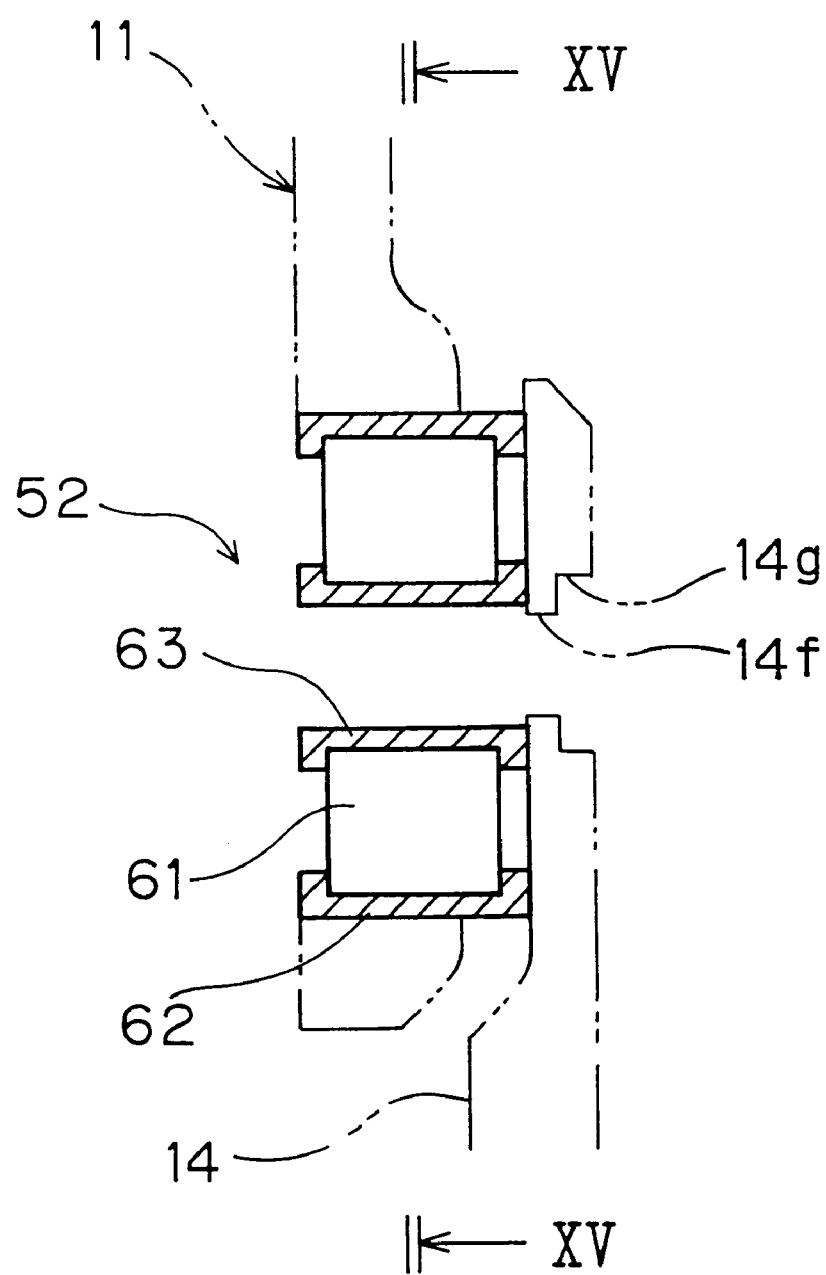
FIG. 14 is an enlarged partial cross-sectional view of an elastic portion assembly of the flywheel assembly illustrated in FIG. 13 in accordance with the second embodiment of the present invention.
Figure 15:
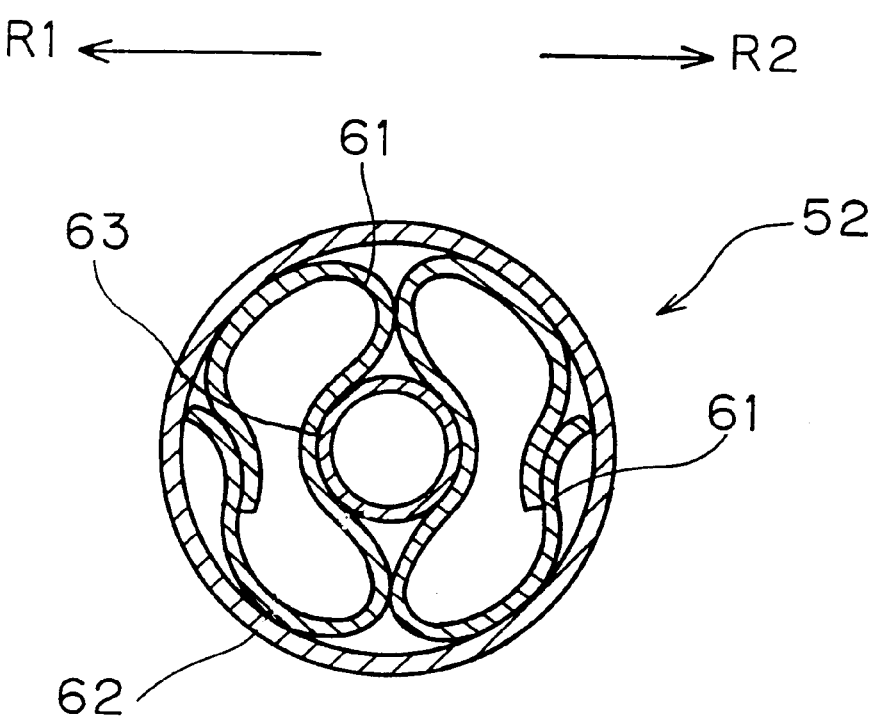
FIG. 15 is an enlarged partial cross-sectional view of the elastic portion assembly illustrated in FIGS. 13 and 14 as viewed along line XV—XV in FIG. 14.

The elastic portion assemblies 52 elastically couple the mass member 11 and the input plate 14 together, as shown in FIG. 13. As shown in FIGS. 14 and 15, each of the elastic portion assemblies 52 has a pair of curved springs 61, a radially inner cylindrical member (small cylindrical or tubular member) 62 and a radially outer cylindrical or tubular member (large cylindrical member) 63. The radially outer cylindrical member 63 has an inner diameter larger than an outer diameter of the inner cylindrical member 62. The radially outer cylindrical member 63 is arranged radially outside the inner cylindrical member 62. There are preferably two curved springs 61, which are arranged between the radially inner and outer cylindrical members 62 and 63 for elastically coupling these cylindrical members 62 and 63 in the rotating and radial directions, as shown in FIG. 15. Of course, additional springs could be used if needed and/or desired.

Each of the curved springs 61 is preferably formed of a thin curved strip of resilient material. The radially inner cylindrical member 62 is provided at its axially opposite ends with radially outward projections each having an annular form. The radially outer cylindrical member 63 is provided at its axially opposite ends with radially inward projections. Each of the projections of outer cylindrical member 63 has an annular form. These projections restrict axial movement of the curved springs 61 as best seen in FIG. 14. The outer and inner cylindrical members 62 and 63 are preferably made of steel.

Referring to FIG. 2, each of the elastic portion assemblies 52 is disposed in the circular aperture 11c of the mass member 11, instead of the rubber members 12. Referring again to FIG. 13, the outer peripheral surface of the radially outer cylindrical member 22 of the elastic portion assembly 52 is fixedly coupled to the inner peripheral surface of the circular aperture 11c. The radially inner cylindrical member 23 is coupled to the outer peripheral portion of the input plate 14 through the pin 16. In this manner, each of the elastic portion assemblies 52 elastically couples the mass portion 11 and the input plate 14 in the circumferential, axial and radial directions. Each of the elastic portion assemblies 52 has its circumferential elasticity (i.e., elasticity in directions R1 and R2 as seen in FIG. 15) which is smaller that the radial elasticity due to the arrangement of the curved springs 61.

The mass portion 11 is coupled to the elastic portion assemblies 52, while the elastic portion assemblies 52 are coupled to the input plate 14, which is carried on the crankshaft 8 of the engine. Thus, these three components (the mass portion 11, the elastic portion assembly 52 and the input plate 14) are rotatably carried on the crankshaft 8 of the engine.

The sub-clutch 13 is a clutch mechanism of a gear-meshing type for engaging and disengaging the above three components (the mass member 11, the elastic portion assemblies 52 and the input plate 14) with and from the input shaft 9 of the transmission. The sub-clutch 13 has the structure similar to that of the first embodiment. Thus, this structure will not be discussed in detail with reference to this embodiment. Rather, it will be apparent to those skilled in the art from this disclosure that the description of this structure as referred to the first embodiment also applies to this second embodiment.

The operations of the coupling mechanism 1 and the dynamic damper 50 will now be described with reference to FIG. 13 of this embodiment and with reference to FIGS. 6, 8–11 of the first embodiment. The rotation of the crankshaft 8 of the engine is transmitted to the input shaft 9 of the transmission through the flywheel assembly 2 and the main clutch 3. When the main clutch 3 is in the disengaged state, the clutch disk assembly 5 is not frictionally engaged with the flywheel 2a and the pressure plate 4c. Thus, when the main clutch 3 is in the disengaged state, the spline hub 5c is in the axial position shown in FIG. 13, and the sub-clutch 13 is in the disengaged state shown in FIG. 8. When the sub-clutch 13 is in the state shown in FIG. 8, the synchronous gear 31b is not in mesh with the teeth 14e. Moreover, when the sub-clutch 13 is in the state shown in FIG. 8, the friction member 45 of the synchronous block 41 is not in frictional engagement with the cylindrical portion 14c of the input plate 14. Therefore, the synchronous gear assembly 30 and the synchronous block 41 rotate together with the input shaft 9 of the transmission, but the input plate 14, the elastic portion assembly 12 and the mass member 11 are independent of the input shaft 9 of the transmission.

When the main clutch 3 is to be engaged, the diaphragm spring 4b forces the pressure plate 4c to move toward the flywheel 2a. This axial movement of the pressure plate 4c causes the clutch disk assembly 5 to be held between the flywheel 2a and the pressure plate 4c. Thereby, the crankshaft 8 of the engine is coupled to the input shaft 9 of the transmission. In this operation, as it is well known, the flexible plate 2c of the flexible plate assembly 2b absorbs the axial vibrations of the crankshaft 8 of the engine, and the coil springs 5b and others of the clutch disk assembly 5 dampen and absorb the torque variation.

When the main clutch 3 is engaged, the spline hub 5c of the clutch disk assembly 5 axially moves toward the engine. Thereby, the spline hub 5c pushes the transmitting member 35 toward the engine to compress the springs 36 by a predetermined length as seen in FIG. 9. Before the state shown in FIG. 9 is attained, the main body 31 receives a reaction force of the springs 36 toward the engine. However, the main body 31 hardly moves in the axial direction because the conical surface 41a of the synchronous block 41 restricts the axial movement of the wire ring 39. As the reaction forces of the springs 36 increase, the wire ring 39 elastically deforms to reduce its diameter. The elastic reaction force of the wire ring 39 acts radially outward on the synchronous block 41 to push the same against the cylindrical portion 14c of the input plate 14. In this manner, the rotation speeds of the input shaft 9 of the transmission and the input plate 14 are gradually synchronized with each other owing to the friction between the friction member 45 of the synchronous block 41 and the cylindrical portion 14c of the input plate 14 until the structure attains the state shown in FIG. 9.

When the springs 36 in the state shown in FIG. 9 are further compressed, the reaction forces of the springs 36 and the amount of the elastic deformation of the wire ring 39 increase so that the outer diameter of the deformed wire wing 39 becomes smaller than the inner diameter of the conical surface 41a. Thereby, the wire ring 39 receives from the synchronous block 41 only the force produced by the friction resistance between the wire ring 39 and the inner peripheral surface of the synchronous block 41. Since this force is much smaller than the reaction force of the springs 36, the springs 36 expand to move axially the main body 31 toward the engine while compressing the return spring 42. Thereby, the synchronous gear 31b is engaged with the teeth 14e as shown in FIG. 10. In this operation, the rotation of the input shaft 9 of the transmission and the rotation of the input plate 14 are synchronized to a certain extent so that the synchronous gear 31b can smoothly mesh with the teeth 14e. Thereafter, the input shaft 9 of the transmission is coupled to the dynamic damper 50 through the synchronous gear 31b and the teeth 14e meshing with each other so that a sufficient torque transmission capacity can be achieved.

When the dynamic damper 50 is coupled to the input shaft 9 of the transmission, the dynamic damper 50 dampens neutral noises of the transmission and noises during driving. In particular, the dynamic damper 50 actively dampens the vibration of the transmission in a partial rotation range.

When the main clutch 3 is disengaged and the spline hub 5c moves toward the transmission, the reaction force of the return spring 42 moves the respective components of the sub-clutch 13 toward the transmission to disengaged the sub-clutch 13.

In this structure, the mass member 11 is radially and axially supported at its radially inner portion. Thus, in the above structure, the input plate 14, which is connected to the input shaft 9 of the transmission, is coupled to the mass member 11 by the elastic portion assemblies 52 including the curved springs 61. In this structure, the function of holding and positioning the mass member 11 with respect to the input plate 14 in the rotating, radial and axial directions is concentrated on the elastic portion assemblies 52. Therefore, it is not necessary to arrange an independent supporting mechanism or the like radially outside the mass member 11, which allows increase in mass of the mass member 11 and therefore increases an allowable range for setting the dampening characteristics. Since each of the elastic assemblies 52 has an anisotropy, it is possible to provide both the appropriate elasticities, i.e., elasticity of the elastic portion assembly 52 in the rotating direction corresponding to the intended dampening characteristics and elasticity of the elastic portion assembly 52 in the radial direction required for supporting the mass member 11 without causing interference with another member.

Third Embodiment

In the following description of the third embodiment, parts and portions which are the same as or similar to those of the first embodiment bear the same reference numbers. Thus, these similar structures will not be discussed in detail with reference to this embodiment. Rather, it will be apparent to those skilled in the art from this disclosure that the description of these similar structures as referred to the first embodiment also apply to this third embodiment.

Figure 16:
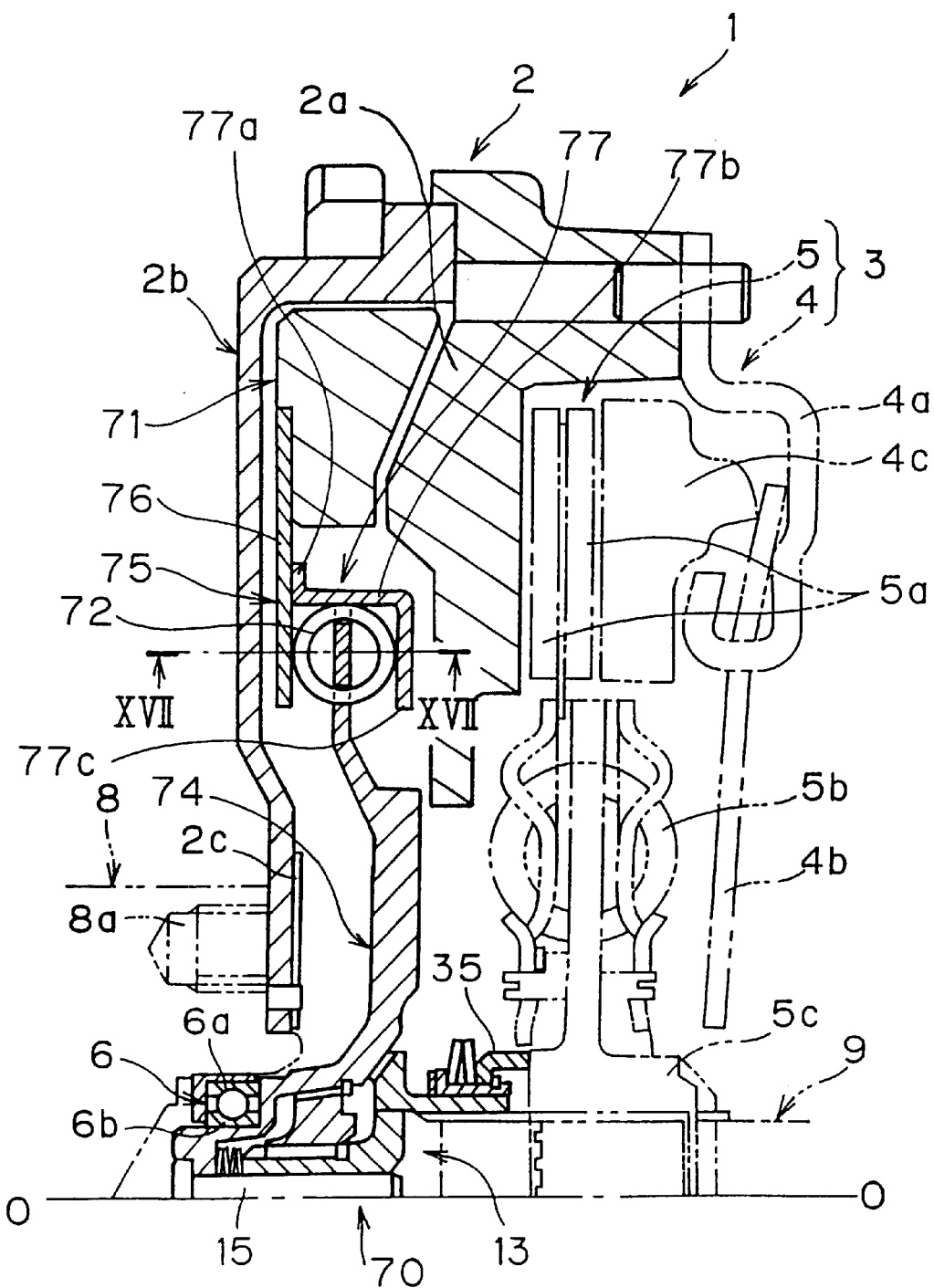
FIG. 16 is a partial cross-sectional view of a flywheel assembly with a dynamic damper employed in a coupling mechanism in accordance with a third embodiment of the present invention.

FIG. 16 shows a cross-sectional view of a flywheel assembly including a dynamic damper 70 in accordance with the third embodiment of the present invention. The dynamic damper 70 is included in the coupling mechanism 1 which engages and disengages the crankshaft 8 of the engine and the input shaft 9 of the transmission with respect to each other. The dynamic damper 70 functions to dampen a vibration of the transmission when coupled to the input shaft 9 of the transmission by the sub-clutch 13.

The coupling mechanism 1 is basically formed of the flywheel assembly 2 including the dynamic damper 70 and the main clutch 3 formed of the clutch cover assembly 4 and the clutch disk assembly 5. The coupling mechanism 1 has the rotation axis represented by line O—O in FIG. 16.

The flywheel assembly 2 is non-rotatably coupled to the crankshaft 8 of the engine. The flywheel assembly 2 is basically formed of the flywheel 2a, the flexible plate assembly 2b and the dynamic damper 70. The flywheel 2a and the flexible plate assembly 2b are coupled together at their outer peripheral portions as shown in FIG. 16. The flexible plate assembly 2b has the thick circular plate and the thin flexible plate 2c having an end fixedly coupled to the inner peripheral portion of the thick circular plate. The other end of the flexible plate 2c is fixedly coupled to the crankshaft 8 of the engine by bolts 8a, which are circumferentially equally spaced from each other. The dynamic damper 70 will be described later in detail.

The clutch cover assembly 4 of the main clutch 3 is basically formed of the clutch cover 4a, the annular diaphragm spring 4b and the pressure plate 4c. The pressure plate 4c is biased toward the engine (i.e., leftward as viewed in FIG. 16) by the diaphragm spring 4b. The clutch cover 4a is fixedly coupled at its outer peripheral portion to the end of the flywheel 2a near the transmission (i.e., right end as viewed in FIG. 16). The inner peripheral portion of the clutch cover 4a carries a radially middle portion of the diaphragm spring 4b via wire rings (not shown). The pressure plate 4c is held within the clutch cover 4a by the outer peripheral portion of the diaphragm spring 4b and others. The pressure plate 4c moves axially when the release bearing (not shown) moves the inner periphery of the diaphragm spring 4b along the rotation axis O—O, i.e., in the axial direction for biasing the pressure plate 4c by the diaphragm spring 4b or releasing the diaphragm spring 4b from the same. The clutch cover assembly 4 operates to bias the pressure plate 4c toward the flywheel 2a, and thereby operates to hold the clutch disk assembly 5 between the flywheel 2a and the pressure plate 4c for frictionally engaging the flywheel assembly 4 and the clutch disk assembly 5 together.

The clutch disk assembly 5 of the main clutch 3 is basically formed of the frictional engagement portion having friction facings 5a, the spline hub 5c having an inner periphery spline-engaged with the input shaft 9 of the transmission and coil springs 5b for elastically coupling the frictional engagement portion and the spline hub 5c together in the rotating direction.

The structure of the dynamic damper 70 will now be described below in more detail. The dynamic damper 70 is basically formed of a mass member (mass portion) 71, a support plate assembly (support plate) 75, four small coil springs (elastic portions) 72, an input plate 73 and the sub-clutch 13.

As seen in FIG. 16, the support plate assembly 75 is basically formed of a first support plate 76 and a second support plate 77. The first support plate 76 has an outer peripheral portion fixedly coupled to the mass member 71 and an inner peripheral portion fixedly coupled to the second support plate 77. The second support plate partially surrounds the coil springs 72 and engages input plate 73.

The first support plate 76 is provided at its inner peripheral portion with stepped portions, which form first circumferential support surfaces 76a engaging with engine side portions of the ends of the small coil springs 72. The inner peripheral portion of the first support plate 76 forms an engine-side restricting surface for restricting movement of the small coil springs 72 toward the engine in the direction along the axis O—O.

Figure 17:
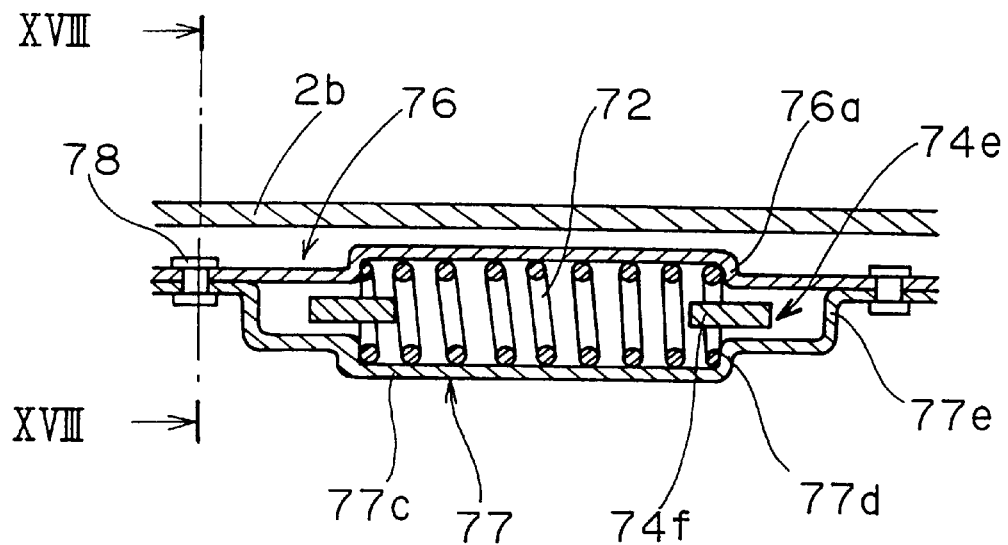
FIG. 17 is an enlarged partial cross-sectional view of the elastic portion assembly illustrated in FIG. 16 as viewed along line XVII—XVII in FIG. 16 in accordance with the third embodiment.
Figure 18:
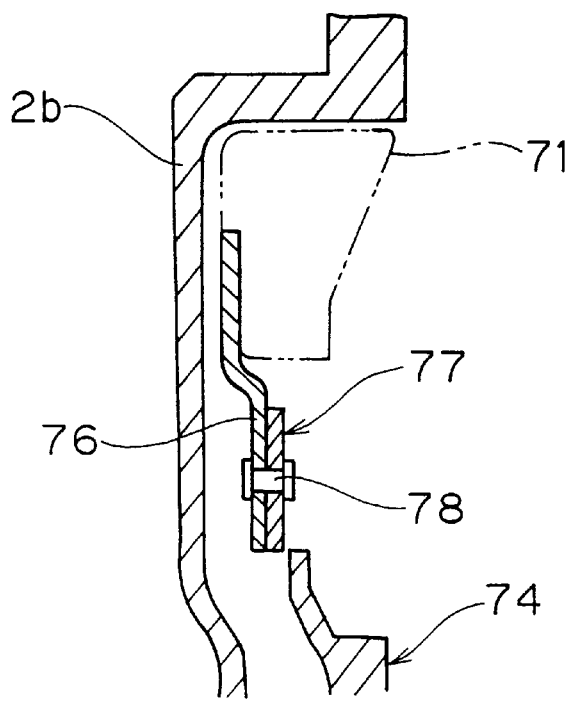
FIG. 18 is an enlarged partial cross-sectional view of a portion of the dynamic damper illustrated in FIGS. 16 and 17 as viewed along line XVIII—XVIII in FIG. 17 in accordance with the third embodiment.

The second support plate 77 is fixedly coupled to the inner peripheral portion of the first support plate 76 by rivets 78 (see FIGS. 17 and 18). As shown in FIG. 17, the second support plate 77 has stepped portions formed around the small coil springs 72 and near the opposite ends of the coil springs 72. As shown in FIG. 16, these stepped portions of the second support plate 77 form engagement surfaces 77b which are in contact with the radially outer ends of the projected portions 74e of the input plate 74, as described below. These stepped portions of the support plate 77 also form the circumferential engagement surfaces 77e which are adapted to engage the circumferential side surfaces of the projected portions 74e. The stepped portions of the support plate 77 also form second circumferential support surfaces 77d which are engaged with the transmission-side portions of the ends of the small coil springs 72. The stepped portions of the support plate 77 also form a transmission-side restricting surface 77c for restricting movement of the small coil springs 72 toward the transmission in the direction along the axis O—O. The circumferential engagement surfaces 77e function as stops for preventing relative rotation between the support plate assembly 75 and the input plate 74 to an excessive extent.

The small coil springs 72 elastically couple the mass member 71 and the support plate assembly 75 to the input plate 74, as shown in FIGS. 16 and 17. Each of the coil springs 72 is positioned such that the coil spring 72 is in contact with the inner peripheral portion (engine-side restricting surface) of the first support plate 76, the transmission-side restricting surface 77c of the second support plate 77 and the engagement surface 77e of the second support plate 77.

As shown in FIGS. 16, 17 and 18, the input plate 74 has an annular plate portion 14a, a conical portion 14b, a cylindrical portion 14c and a concave portion 14d, which are formed integrally with each other. The input plate 74 has an inner peripheral portion fixedly coupled to the inner race 6b of the ball bearing 6. Since the outer race 6a of this ball bearing 6 is fixedly coupled to the crankshaft 8 of the engine, the input plate 74 is rotatably supported on the crankshaft 8 of the engine and is unmovable thereto in the axial and radial directions.

Figure 19:
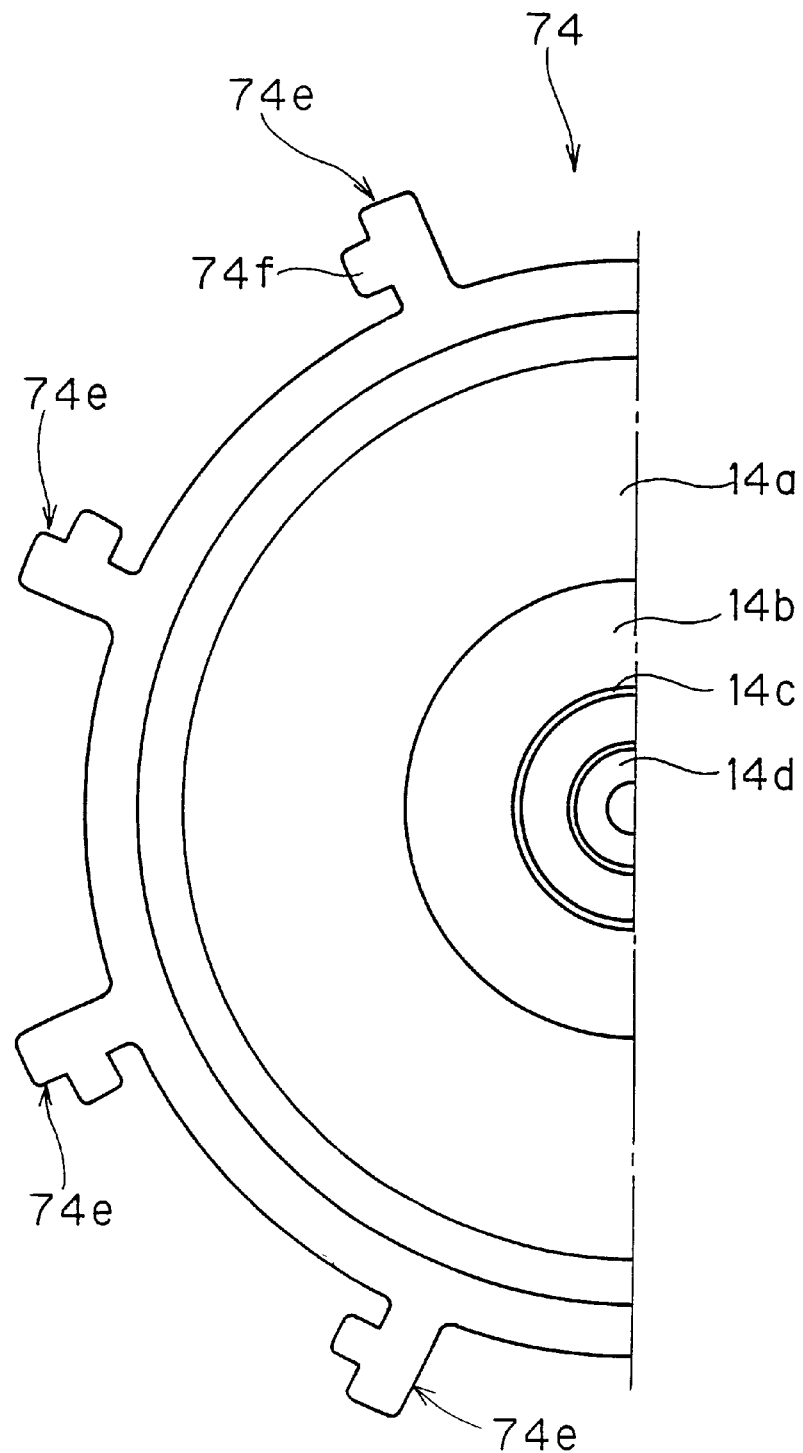
FIG. 19 is a partial side elevational view of an input plate for the dynamic damper illustrated in FIGS. 16–18 as viewed from a transmission side in accordance with the third embodiment.

The annular plate portion 14a is provided at its outer periphery with radially outwardly projected portions 74e, as shown in FIG. 19. Each projected portion 74e is provided at its side circumferentially neighboring to the small coil spring 72 with a projection 74f having the substantially same width as the inner diameter of the small coil spring 72. The projection 74f is fitted into the end of the small coil spring 72.

The conical portion 14b extends radially inward and obliquely toward the engine from the inner periphery of the annular plate portion 14a. The conical portion 14b is provided at its inner peripheral surface with teeth 14e (second gear) as shown in FIG. 8.

The cylindrical portion 14c extends from the inner periphery of the conical portion 14b toward the engine substantially along the axis O—O. The cylindrical portion 14c has a tapered inner peripheral surface converging toward the engine.

The concave portion 14d is arranged radially inside the cylindrical portion 14c. The concave portion 14d is provided at a center of its bottom with a recess and an aperture into which a core member 15 is inserted and fixed. The outer peripheral surface of the concave portion 14d is fixedly coupled to the inner race 6b of the ball bearing 6 (see FIG. 8).

As described above, the mass portion 71 is coupled to the input plate 74 through the small coil springs 72 and others, and the input plate 74 is carried on the crankshaft 8 of the engine. Thus, these three components (the mass portion 71, the small springs 72 and the input plate 74) are rotatably carried on the crankshaft 8 of the engine.

The sub-clutch 13 is a clutch mechanism of a gear-meshing type for engaging and disengaging the above three components (the mass portion 71, the small springs 72 and the input plate 74) with and from the input shaft 9 of the transmission. The sub-clutch 13 is basically formed of the synchronous gear assembly 30, the synchronous block 41, the return spring 42 and the snap ring 43 as shown FIG. 7.

As shown in FIGS. 6 and 8, the synchronous gear assembly 30 basically includes the main body 31, the force reducing mechanism 33, the one-way engagement member 34 and the wire ring 39. The synchronous gear assembly 30 is also provided with the position correcting mechanism 32.

The main body 31 is basically formed of the large cylindrical portion 31a, the synchronous gear (first gear) 31b and the small cylindrical portion 31c. The synchronous gear (first gear) 31b extends radially outward from an end of the large cylindrical portion 31a near the engine, while the small cylindrical portion 31c extends radially inward from the end of the large cylindrical portion 31a near the engine.

The large cylindrical portion 31a is provided at its inner peripheral surface with spline grooves 31f engaged with the input shaft 9 of the transmission (see FIG. 6). The main body 31 is spline-engaged with the input shaft 9 of the transmission, and therefore is axially movable but non-rotatable with respect to the input shaft 9 of the transmission. The large cylindrical portion 31a is provided at its outer peripheral surface with one-way grooves 31d as shown in FIG. 6. The surface of each one-way groove 31d opposed to the engine, i.e., the surface defining the right edge of the groove in FIG. 6 is substantially perpendicular to the rotation axis O—O. The surface of the one-way groove 31d opposed to the transmission, i.e., the left surface in FIG. 6 is inclined such that its inner periphery is shifted toward the transmission with respect to its outer periphery.

When the sub-clutch 13 is in the disengaged state shown in FIG. 8, the synchronous gear 31b is opposed to the teeth 14e of the conical portion 14b of the input plate 74 with a small space therebetween. When the sub-clutch 13 is in the engaged state shown in FIG. 10, the synchronous gear 31b is engaged with the teeth 14e.

The small cylindrical portion 31c has a smaller diameter than the large cylindrical portion 31a, and its inner peripheral surface is axially movable in contact with the core member 15. The outer peripheral surface of the small cylindrical portion 31c is provided at its portion near the engine (left portion in FIG. 8) with teeth. The outer peripheral surface of the small cylindrical portion 31c is also provided with an annular groove 31e at a portion near the transmission (i.e., the right potion as viewed in FIG. 8). The opposite side surfaces of the groove 31e restrict the axial movement of the wire ring 39 with respect to the main body 31. The inner peripheral surface of the groove 31e has a diameter smaller than the inner diameter of the wire ring 39 so that the wire ring 39 in the groove 31e can deform elastically and radially inward.

The force reducing mechanism 33 is provided for reducing the axial force, which is supplied from the spline hub 5c, to a predetermined value and transmitting the same to the main body 31. The force reducing mechanism 33 is formed of the transmitting member 35, the springs 36, the spring retainer member 37 and the ring 38, as shown in FIG. 6. The end of the transmitting member 35 near the transmission is in contact with the end surface of the spline hub 5c near the engine, as shown in FIG. 1. As shown in FIG. 6, the spring retainer member 37 is formed of the cylindrical inner periphery retaining portion 37a and an axial restricting portion 37b extending radially outward from the end of the inner periphery retaining portion 37a near the engine. The groove 37c holding the ring 38 fitted therein is formed at a portion of the outer peripheral surface of the inner periphery retaining portion 37a near the transmission. The springs 36 are two annular conical springs each having an inner diameter nearly equal to the outer diameter of the inner periphery retaining portion 37a, and are held between the end surface of the transmitting member 35 near the engine and the end surface of the axial restricting portion 37b near the transmission. The ring 38 is fixedly coupled in the groove 37c and restricts the movement of the transmitting member 35 toward the transmission.

The one-way engagement member 34 is an annular plate, which is provided for transmitting the axial force between the force reducing mechanism 33 and the main body 31 therethrough and for forming the position correcting mechanism 32 together with the main body 31 and the one-way grooves 31d. The inner peripheral surface of the one-way engagement member 34 is tapered and diverges toward the engine. The inclination of the inner peripheral surface of the one-way engagement portion 34 is substantially equal to the inclination of the surface of the one-way groove 31 opposed to the transmission. The surface of the one-way engagement member 34 opposed to the transmission is in contact with the axial restriction portion 37b of the spring retainer member 37 of the force reducing mechanism 33. The one-way engagement member 34 has a predetermined elasticity, and can be elastically deformed radially outward by a force applied radially outward to the inner peripheral surface thereof.

The position correction mechanism 32 utilizes the meshing of the one-way engagement member 34 with the one-way groove 31d (i.e., a pair of one-way engagement portion) as well as elastic deformation of the one-way engagement member 34 (see FIG. 6). This position correction mechanism 32 prevents the relative movement in the axial direction between the force reducing mechanism 33 and the main body 31 when the axial force transmitted between the force reducing mechanism 33 and the main body 31 does not exceed a predetermined value (F1), and shifts the main body 31 of the force reducing mechanism 33 toward the engine when the axial force transmitted between the force reducing mechanism 33 and the main body 31 exceeds the predetermined value (F1). When the axial force transmitted between the force reducing mechanism 33 and the main body 31 is not larger than the predetermined value (F1), the force biasing the force reducing mechanism 33 toward the engine is transmitted to the main body 31 through the contact portions of the inner peripheral surface of the one-way engagement member 34 and the surface of the one-way groove 31d opposed to the transmission. Thereby, the main body 31 moves the substantially same distance as the force reducing mechanism 33. When the axial force transmitted between the force reducing mechanism 33 and the main body 31 exceeds the predetermined value (F1), a radial reaction force, which acts on the one-way engagement portion 34 and the main body 31 through the contact portions of the inner peripheral surface of the one-way engagement member 34 and the surface of the one-way groove 31d opposed to the transmission, exceeds a predetermined value (F2). This force of F2 elastically deforms the one-way engagement member 34 to increase the inner diameter of the one-way engagement member 34 above the outer diameter of the surface of the one-way groove 31d opposed to the transmission. Thereby, the one-way engagement member 34 and the one-way groove 31d, which axially coupled the force reducing mechanism 33 and the main body 31 together, are disengaged from each other, and thus the coupling between the force reducing mechanism 33 and the main body 31 is temporarily released so that the force reducing mechanism 33 moves toward the engine with respect to the main body 31. Thereby, the one-way engagement portion 34 engages with the one-way groove 31d again in a new position.

The wire ring 39 has a circular cross section with a predetermined elasticity. The wire ring 39 is disposed in the groove 31e. The synchronous block 41 has an inner peripheral surface, which is spline-engaged with the small cylindrical portion 31c of the main body 31 of the synchronous gear assembly 30. The main body 31 non-rotatably and axially movably carries the synchronous block 41. The synchronous block 41 has the conical surface 41a, which converges toward the engine. The synchronous block 41 has one end of a diameter larger than the outer diameter of the wire ring 39 and the other end of a diameter smaller than the outer diameter of the same as shown in FIG. 8. The conical surface 41a is in contact with the wire ring 39 for transmitting a force between them. The friction member 45 is attached to the outer peripheral surface of the synchronous block 41. The outer peripheral surface of the synchronous block 41 and the outer surface (friction surface) of the friction member 45 have the substantially same inclination as the inner peripheral surface of the cylindrical portion 14c of the input plate 74. The outer peripheral surface of the synchronous block 41 and the outer surface (friction surface) of the friction member 45 are frictionally engaged with the inner peripheral surface of the cylindrical portion 14c when the sub-clutch 13 is engaged.

The return spring 42 is formed of four annular conical springs and has inner peripheries, which are in contact with the outer peripheral surface of the core member 15. The return spring 42 has an end near the engine, which is in contact with the concave portion 14d of the input plate 74. The other end of the return spring 42, which is near the transmission, is in contact with the small cylindrical portion 31c of the main body 31 of the synchronous gear assembly 30. Thereby, the return spring 42 biases the main body 31 of the synchronous gear assembly 30 toward the transmission.

The snap ring 43 has a square section, which is fitted into the groove formed at an end near the transmission of the inner peripheral surface of the cylindrical portion 14c of the input plate 74. The snap ring 43 is in contact with the outer peripheral portion of the end of the synchronous block 41 near the transmission for restricting the axial movement of the synchronous block 41 toward the transmission.

Description will now be given on operations of the coupling mechanism 1 and the dynamic damper 70. The rotation of the crankshaft 8 of the engine is transmitted to the input shaft 9 of the transmission through the flywheel assembly 2 and the main clutch 3. When the main clutch 3 is in the disengaged state, the clutch disk assembly 5 is not frictionally engaged with the flywheel 2a and the pressure plate 4c. Therefore, the spline hub 5c is in the axial position as shown in FIG. 16, and the sub-clutch 13 is in the disengaged state shown in FIG. 8. When the sub-clutch 13 is in the state shown in FIG. 8, the synchronous gear 31b is not in mesh with the teeth 14e, and the friction member 45 of the synchronous block 41 is not in frictional engagement with the cylindrical portion 14c of the input plate 74. Therefore, the synchronous gear assembly 30 and the synchronous block 41 rotate together with the input shaft 9 of the transmission, but the input plate 74, the small coil springs 72 and the mass member 71 are independent of the input shaft 9 of the transmission.

When the main clutch 3 is to be engaged, the diaphragm spring 4b forces the pressure plate 4c to move toward the flywheel 2a so that the clutch disk assembly 5 is held between the flywheel 2a and the pressure plate 4c. Thereby, the crankshaft 8 of the engine is coupled to the input shaft 9 of the transmission. In this operation, as it is well known, the flexible plate 2c of the flexible plate assembly 2b absorbs the axial vibration of the crankshaft 8 of the engine, and the coil springs 5b and others of the clutch disk assembly 5 dampen and absorb the torque variation.

When the main clutch 3 is engaged, the spline hub 5c of the clutch disk assembly 5 axially moves toward the engine. Thereby, the spline hub 5c pushes the transmitting member 35 toward the engine to compress the springs 36 by a predetermined length as seen in FIG. 9. Before the state shown in FIG. 9 is attained, the main body 31 receives a reaction force of the springs 36 toward the engine. However, the main body 31 hardly moves in the axial direction because the conical surface 41a of the synchronous block 41 restricts the axial movement of the wire ring 39. As the reaction force of the springs 36 increases, the wire ring 39 elastically deforms to reduce its diameter. The elastic reaction force of the wire ring 39 acts radially outward on the synchronous block 41 to push the same against the cylindrical portion 14c of the input plate 74. In this manner, the rotation speeds of the input shaft 9 of the transmission and the input plate 74 are gradually synchronized with each other owing to the friction between the friction member 45 of the synchronous block 41 and the cylindrical portion 14c of the input plate 74 until the structure attains the state shown in FIG. 9.

When the springs 36 in the state shown in FIG. 9 are further compressed, the reaction force of the springs 36 and the amount of the elastic deformation of the wire ring 39 increase so that the outer diameter of the deformed wire wing 39 becomes smaller than the inner diameter of the conical surface 41a. Thereby, the wire ring 39 receives from the synchronous block 41 only the force produced by the friction resistance between the wire ring 39 and the inner peripheral surface of the synchronous block 41. Since this force is much smaller than the reaction force of the springs 36, the springs 36 expand to move axially the main body 31 toward the engine while compressing the return spring 42. Thereby, the synchronous gear 31b is engaged with the teeth 14e as seen in FIG. 10. In this operation, the rotation of the input shaft 9 of the transmission and the rotation of the input plate 74 are synchronized to a certain extent so that the synchronous gear 31b can smoothly mesh with the teeth 14e. Thereafter, the input shaft 9 of the transmission is coupled to the dynamic damper 70 through the synchronous gear 31b and the teeth 14e meshing with each other so that a sufficient torque transmission capacity can be achieved.

When the dynamic damper 70 is coupled to the input shaft 9 of the transmission, the dynamic damper 70 dampens neutral noises of the transmission and noises during driving. In particular, the dynamic damper 70 actively dampens the vibration of the transmission in a partial rotation range.

When the main clutch 3 is disengaged and the spline hub 5c moves toward the transmission, the reaction force of the return spring 42 moves the respective components of the sub-clutch 13 toward the transmission to disengaged the sub-clutch 13.

In this structure, the mass member 71 is radially supported at its radially inner portion. More specifically, engagement of the engagement surfaces 77b of the second support plate 77 with the projected portion 74e of the input plate 74 restricts the radial movement of the support plate assembly 75, which is fixedly coupled to the mass member 71, with respect to the input plate 74 connected to the input shaft 9 of the transmission. Therefore, it is not necessary to arrange an independent supporting mechanism or the like radially outside the mass member 71, which allows increase in mass of the mass member 71 and therefore increases an allowable range for setting the dampening characteristics.

According to the invention, the mass portion is radially supported at its radially inner portion. Therefore, it is not necessary to arrange an independent supporting mechanism or the like radially outside the mass portion, which allows increase in mass of the mass portion and therefore increases an allowable range for setting the dampening characteristics.

While only three embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A dynamic damper assembly adapted to be employed in a coupling mechanism including a main clutch coupled between a crankshaft of an engine and an input shaft of a transmission, and being adapted to rotate with the input shaft of the transmission, said dynamic damper assembly comprising:

a mass portion adapted to rotate with the input shaft of the transmission, said mass portion having an inner radial portion and an outer radial portion, said mass portion being radially supported at said inner radial portion;

a sub-clutch having a first part operatively coupled to said mass portion and a second part adapted to be coupled to the input shaft to release the input shaft of the transmission from said mass portion when the main clutch disengages the crankshaft of the engine from the input shaft of the transmission, said first part of said sub-clutch having an input plate with an inner end fixedly coupled thereto and extending radially outwardly therefrom, said input plate having an axial length and a radial length with said radial length being greater than said axial length to space said mass portion radially outwardly from said sub-clutch by a distance greater than said axial length of said input plate; and an elastic portion having at least two elastic elements elastically coupled between said mass portion and said input plate for coupling the input shaft of the transmission and said mass portion in a rotating direction when the input shaft of the transmission and said mass portion are interlocked together by said sub-clutch.

2. The dynamic damper assembly according to claim 1, further comprising:

a support plate having an outer peripheral portion supporting said mass portion and an inner peripheral portion engaged with said input plate, and thereby radially supporting said mass portion with respect to the input shaft of the transmission.

3. The dynamic damper assembly according to claim 2, wherein said elastic portion includes at least one coil spring coupling said input plate to said support plate.

4. The dynamic damper assembly according to claim 3, wherein said input plate is provided with a projected portion projecting radially outward for engagement with an end of said coil spring.

5. The dynamic damper assembly according to claim 1, wherein said elastic portion includes a small cylindrical member, a large cylindrical member and an elastic member coupled between said small cylindrical member and said large cylindrical member, said large cylindrical member having an inner diameter larger than an outer diameter of said small cylindrical member and arranged radially outside said small cylindrical member.

6. The dynamic damper assembly according to claim 5, wherein said small cylindrical member is coupled to said first part of said sub-clutch and said large cylindrical member is coupled to said mass portion.

7. The dynamic damper assembly according to claim 5, wherein said elastic member includes at least one curved spring arranged between said small and large cylindrical members to elastically couple said small and large cylindrical members together in rotating and radial directions.

8. A The dynamic damper assembly according to claim 7, wherein said curved spring has an elasticity in the radial direction between said small and large cylindrical members, which is larger than an elasticity in the rotating direction between said small and large cylindrical members.

9. The dynamic damper assembly according to claim 7, wherein said small and large cylindrical members are coupled together by a combination of at least two of said curved springs.

10. The dynamic damper assembly according to claim 9, wherein said curved springs have an elasticity in the radial direction between said small and large cylindrical members, which is larger than an elasticity in the rotating direction between said small and large cylindrical members.

11. The dynamic damper assembly according to claim 7, wherein said curved spring is produced from at least one resilient sheet material that is an elongated strip.

12. The dynamic damper assembly according to claim 5, wherein said elastic member has an elasticity in the radial direction between said small and large cylindrical members, which is larger than an elasticity in the rotating direction between said small and large cylindrical members.

13. The dynamic damper assembly according to claim 1, wherein said elastic portion includes a rubber member, and said mass portion is supported in the radial and axial directions by virtue of the rigidities of said rubber member in the radial and axial directions.

14. The dynamic damper assembly according to claim 13, wherein said rubber member is tubular with an inner peripheral surface and an outer peripheral surface, and said elastic portion further includes a radially inner tubular member attached to said inner peripheral surface of said rubber member, and a radially outer tubular member attached to said outer peripheral surface of said rubber member.

15. The dynamic damper assembly according to claim 13, wherein said elastic portion has an anisotropy providing different elasticities in the rotating and radial directions, respectively.

16. The dynamic damper assembly according to claim 15, wherein said rubber member is provided with a hollow for providing the elasticity of said elastic portion in the rotating direction smaller than the elasticities of said elastic portion in the radial and axial directions.

17. The dynamic damper assembly according to claim 1, wherein said elastic portion has a first elasticity in the rotating direction and a second elasticity in the axial direction which is different from said first elasticity of said elastic portion in the rotating direction.

18. A dynamic damper assembly adapted to be employed in a coupling mechanism including a main clutch coupled between a crankshaft of an engine and an input shaft of a transmission, and being adapted to rotate with the input shaft of the transmission, said dynamic damper assembly comprising:

a mass portion adapted to rotate with the input shaft of the transmission, said mass portion having an inner radial portion and an outer radial portion, said mass portion being radially supported at said inner radial portion;

a sub-clutch having a first part coupled to said mass portion and a second part adapted to be coupled to the input shaft to release the input shaft of the transmission from said mass portion when the main clutch disengages the crankshaft of the engine from the input shaft of the transmission;

an elastic portion elastically coupling the input shaft of the transmission and said mass portion in a rotating direction when the input shaft of the transmission and said mass portion are interlocked together by said sub-clutch;

an input plate releasably coupled to said second part of said sub-clutch; and a support plate having an outer peripheral portion supporting said mass portion and an inner peripheral portion engaged with said input plate, and thereby radially supporting said mass portion with respect to the input shaft of the transmission, said elastic portion including at least one coil spring coupling said input plate to said support plate, said input plate being provided with a projected portion projecting radially outward for engagement with an end of said coil spring, said input plate having a radially outer end in contact with said support plate.

19. The dynamic damper assembly according to claim 18, wherein said support plate is provided with an engagement surface engaged with said projected portion of said input plate, a pair of circumferentially supporting surfaces in contact with circumferentially opposite ends of said coil spring, and a restricting surface restricting deformation of said coil spring in the direction along the input shaft of the transmission.

20. A flywheel assembly adapted to be employed in a coupling mechanism including a main clutch coupled between a crankshaft of an engine and an input shaft of a transmission, and being adapted to rotate with the input shaft of the transmission, said flywheel assembly comprising:

a flywheel coupled non-rotatably to a crankshaft of the engine, and disengageably coupled to a clutch disk assembly coupled to the input shaft of the transmission;

a mass portion adapted to rotate with the input shaft of the transmission, said mass portion having an inner radial portion and an outer radial portion, said mass portion being radially supported at said inner radial portion;

a sub-clutch having a first part operatively coupled to said mass portion and a second part adapted to be coupled to the input shaft to release the input shaft of the transmission from said mass portion when the main clutch disengages the crankshaft of the engine from the input shaft of the transmission, said first part of said sub-clutch having an input plate with an inner end fixedly coupled thereto and extending radially therefrom, said input plate having an axial length and a radial length with said radial length being greater than said axial length to space said mass portion radially outwardly from said sub-clutch by a distance greater than said axial length of said input plate; and an elastic portion having at least two elastic elements elastically coupled between said mass portion and said input plate for coupling the input shaft of the transmission and said mass portion in a rotating direction when the input shaft of the transmission and said mass portion are interlocked together by said sub-clutch.

21. The flywheel assembly according to claim 20, further comprising:

a support plate having an outer peripheral portion supporting said mass portion and an inner peripheral portion engaged with said input plate, and thereby radially supporting said mass portion with respect to the input shaft of the transmission.

22. The flywheel assembly according to claim 21, wherein said elastic portion includes at least one coil spring coupling said input plate to said support plate.

23. The flywheel assembly according to claim 22, wherein said input plate is provided with a projected portion projecting radially outward for engagement with an end of said coil spring.

24. The flywheel assembly according to claim 20, wherein said elastic portion includes a small cylindrical member, a large cylindrical member and an elastic member coupled between said small cylindrical member and said large cylindrical member, said large cylindrical member having an inner diameter larger than an outer diameter of said small cylindrical member and arranged radially outside said small cylindrical member.

25. The flywheel assembly according to claim 24, wherein said small cylindrical member is coupled to said first part of said sub-clutch and said large cylindrical member is coupled to said mass portion.

26. The flywheel assembly according to claim 24, wherein said elastic member includes at least one curved spring arranged between said small and large cylindrical members to elastically couple said small and large cylindrical members together in rotating and radial directions.

27. The flywheel assembly according to claim 26, wherein said small and large cylindrical members are coupled together by a combination of at least two of said curved springs.

28. The flywheel assembly according to claim 27, wherein said curved springs have an elasticity in the radial direction between said small and large cylindrical members, which is larger than an elasticity in the rotating direction between said small and large cylindrical members.

29. The flywheel assembly according to claim 26, wherein said curved spring is produced from at least one resilient sheet material that is an elongated strip.

30. The flywheel assembly according to claim 26, wherein said curved spring has an elasticity in the radial direction between said small and large cylindrical members, which is larger than an elasticity in the rotating direction between said small and large cylindrical members.

31. The flywheel assembly according to claim 24, wherein said elastic member has an elasticity in the radial direction between said small and large cylindrical members, which is larger than an elasticity in the rotating direction between said small and large cylindrical members.

32. The flywheel assembly according to claim 20, wherein said elastic portion includes a rubber member, and said mass portion is supported in the radial and axial directions by virtue of the rigidities of said rubber member in the radial and axial directions.

33. The flywheel assembly according to claim 32, wherein said rubber member is tubular with an inner peripheral surface and an outer peripheral surface, and said elastic portion further includes a radially inner tubular member attached to said inner peripheral surface of said rubber member, and a radially outer tubular member attached to said outer peripheral surface of said rubber member.

34. The flywheel assembly according to claim 32, wherein said elastic portion has an anisotropy providing different elasticities in the rotating and radial directions, respectively.

35. The flywheel assembly according to claim 34, wherein said rubber member is provided with a hollow for providing the elasticity of said elastic portion in the rotating direction smaller than the elasticities of said elastic portion in the radial and axial directions.

36. The flywheel assembly according to claim 20, wherein said elastic portion has a first elasticity in the rotating direction and a second elasticity in the axial direction which is different from said first elasticity of said elastic portion in the rotating direction.

37. A flywheel assembly adapted to be employed in a coupling mechanism including a main clutch coupled between a crankshaft of an engine and an input shaft of a transmission, and being adapted to rotate with the input shaft of the transmission, said flywheel assembly comprising:

a flywheel coupled non-rotatably to a crankshaft of the engine, and disengageably coupled to a clutch disk assembly coupled to the input shaft of the transmission;

a mass portion adapted to rotate with the input shaft of the transmission, said mass portion having an inner radial portion and an outer radial portion, said mass portion being radially supported at said inner radial portion;

a sub-clutch having a first part coupled to said mass portion and a second part adapted to be coupled to the input shaft to release the input shaft of the transmission from said mass portion when the main clutch disengages the crankshaft of the engine from the input shaft of the transmission;

an elastic portion elastically coupling the input shaft of the transmission and said mass portion in a rotating direction when the input shaft of the transmission and said mass portion are interlocked together by said sub-clutch;

an input plate releasably coupled to said second part of said sub-clutch; and a support plate having an outer peripheral portion supporting said mass portion and an inner peripheral portion engaged with said input plate, and thereby radially supporting said mass portion with respect to the input shaft of the transmission, said elastic portion including at least one coil spring coupling said input plate to said support plate, said input plate being provided with a projected portion projecting radially outward for engagement with an end of said coil spring, said input plate having a radially outer end in contact with said support plate.

38. The flywheel assembly according to claim 37, wherein said support plate is provided with an engagement surface engaged with said projected portion of said input plate, a pair of circumferentially supporting surfaces in contact with circumferentially opposite ends of said coil spring, and a restricting surface restricting deformation of said coil spring in the direction along the input shaft of the transmission.

* * * * *